(12) United States Patent
Jaramillo

(10) Patent No.: US 11,628,369 B2
(45) Date of Patent: Apr. 18, 2023

(54) METHOD OF CONDUCTING FANTASY SPORTS COMPETITIONS FOR MULTI-ROUND COMPETITIVE PLAY INCLUDING A UNIQUE PAYOUT STRUCTURE

(71) Applicant: Two Nine Gaming, Inc., Scottsdale, AZ (US)

(72) Inventor: Jason Jaramillo, Scottsdale, AZ (US)

(73) Assignee: Two Nine Sports, Inc., Middletown, DE (US)

( * ) Notice: Subject to any disclaimer, the term of this patent is extended or adjusted under 35 U.S.C. 154(b) by 94 days.

(21) Appl. No.: 16/900,801

(22) Filed: Jun. 12, 2020

(65) Prior Publication Data
US 2020/0391121 A1   Dec. 17, 2020

Related U.S. Application Data

(60) Provisional application No. 62/860,636, filed on Jun. 12, 2019.

(51) Int. Cl.
*A63F 13/00* (2014.01)
*A63F 9/24* (2006.01)
*A63F 13/828* (2014.01)
*A63F 13/792* (2014.01)
*A63F 13/35* (2014.01)

(52) U.S. Cl.
CPC ............ *A63F 13/828* (2014.09); *A63F 13/35* (2014.09); *A63F 13/792* (2014.09)

(58) Field of Classification Search
CPC .................................................. G07F 17/3244
See application file for complete search history.

(56) References Cited

U.S. PATENT DOCUMENTS

| | | | | |
|---|---|---|---|---|
| 2006/0100006 A1* | 5/2006 | Mitchell | ................. | G07F 17/32 463/9 |
| 2010/0311484 A1* | 12/2010 | Suh | ......................... | G07F 17/32 463/4 |
| 2015/0005076 A1* | 1/2015 | Stephenson, Jr. | ...... | A63F 13/828 463/42 |

* cited by examiner

*Primary Examiner* — Milap Shah
*Assistant Examiner* — Jason Pinheiro
(74) *Attorney, Agent, or Firm* — The Myers Law Group; Justin G. Sanders

(57) ABSTRACT

A non-transitory computer-readable medium comprising computer software implemented system for establishing and operating a fantasy sports betting contest application platform designed to provide to a plurality of contestants an ability to participate in a multi-round betting contest, to provide to one or more contestants of the plurality of contestants an ability to collectively agree to split a first wager pot, upon the remaining number of contestants falling below a set threshold, and to provide to one or more contestants of the plurality of contestants comprising round winners an ability to participate in round-payouts from a second wager pot, where the computer software is executed on a plurality of computers, including a user interface, in conjunction with processors, memory, bus elements and a network connection.

10 Claims, 31 Drawing Sheets

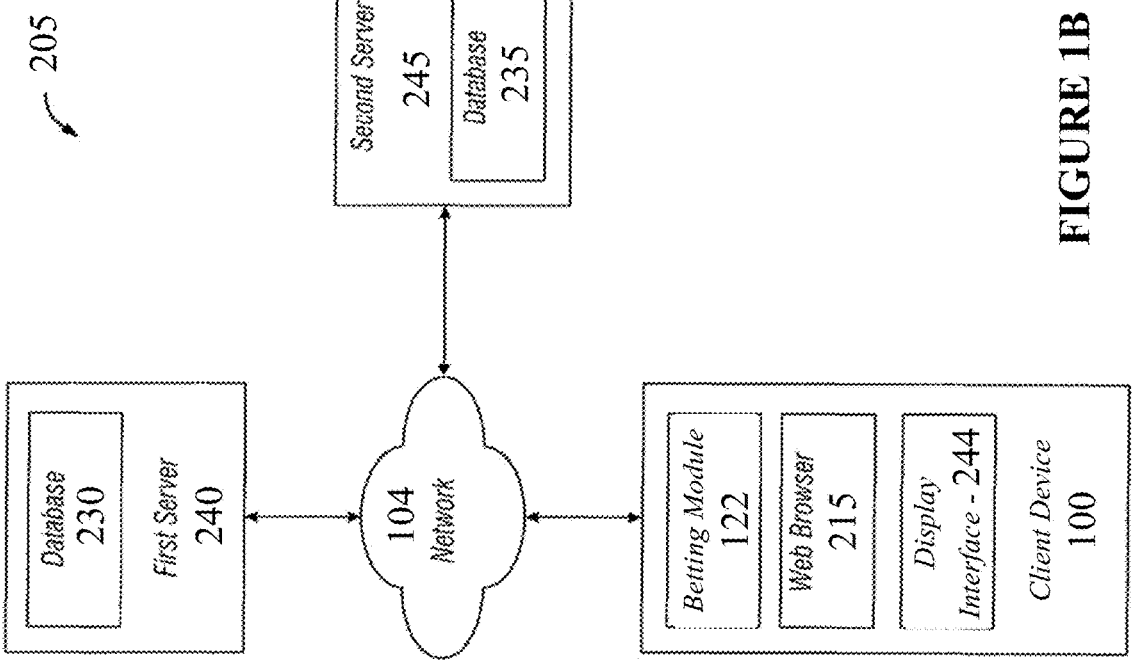
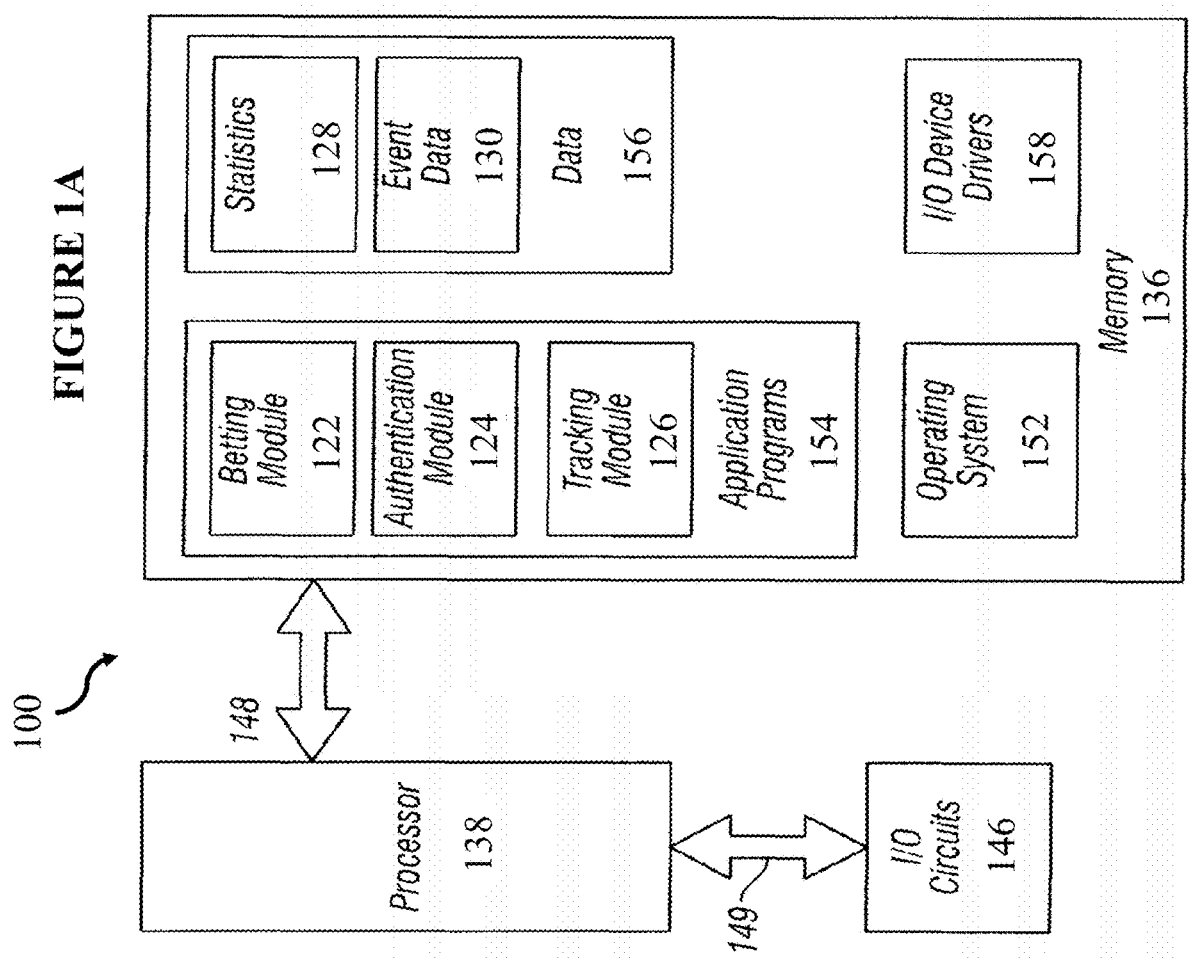

Baseball

| Contest Details | Players | Entry Fee | Total Prizes Avail | 1/2 reserved for Daily | 1/2 for Winning Contest | | |
|---|---|---|---|---|---|---|---|
| | 100 | 100 | 10000 | 5000 | 5000 | | |

| Round | Remaining Players | Eliminated Players | 1/2 Entry Fee | Available for Prizes | Per Player Payout | Remaining Available or Daily Prizes for next round | |
|---|---|---|---|---|---|---|---|
| | | | Daily Round Progessions | | | | |
| 2 | 80 | 20 | $50.00 | $1000.00 | $12.50 | 4000 | |
| 3 | 60 | 20 | $50.00 | $1000.00 | $16.67 | 3000 | |
| 4 | 45 | 15 | $50.00 | $750.00 | $16.67 | 2250 | |
| 5 | 15 | 20 | $50.00 | $1000.00 | $66.67 | 1250 | |
| | | | Contest Winner | | | Winning Amount | Total Won including their own entry fee |
| 6 | 1 | 14 | $50.00 | $700.00 | $700.00 | $5000.00 | $5750.00 |

FIGURE 11

Basketball

| Contest Details | Players | Entry Fee | Total Prizes Avail | 1/2 reserved for Daily | 1/2 for Winning Contest |
|---|---|---|---|---|---|
| | 100 | 50 | 5000 | 2500 | 2500 |

Daily Round Progressions

| Round | Remaining Players | Eliminated Players | 1/2 Entry Fee | Available for Prizes | Per Player Payout | Remaining Available or Daily Prizes for next round |
|---|---|---|---|---|---|---|
| 2 | 90 | 10 | $25.00 | $250.00 | $2.78 | 2250 |
| 3 | 70 | 20 | $25.00 | $500.00 | $7.14 | 1750 |
| 4 | 40 | 30 | $25.00 | $750.00 | $18.75 | 1000 |
| 5 | 20 | 20 | $25.00 | $500.00 | $25.00 | 500 |

Contest Winner

| Round | Remaining Players | Eliminated Players | 1/2 Entry Fee | Available for Prizes | Winning Amount | Total Won including their own entry fee |
|---|---|---|---|---|---|---|
| 6 | 1 | 19 | $25.00 | $475.00 | $2500.00 | $3000.00 |

FIGURE 12

| Contest Details | Players | Entry Fee | Total Prizes Avail | 1/2 reserved for Daily | 1/2 for Winning Contest | | |
|---|---|---|---|---|---|---|---|
| | 250 | 200 | 50000 | 25000 | 25000 | | |
| Golf | | | | | | | |
| | | | 4 Day Progression | | | | |
| Round | Remaining Players | Eliminated Players | 1/2 Entry Fee | Available for Prizes | Per Player Payout | Remaining Available or Daily Prizes for next round | |
| 2 | 140 | 110 | $100.00 | $11000.00 | $78.57 | 14000 | |
| 3 | 55 | 85 | $100.00 | $8500.00 | $154.55 | 5500 | |
| | | | Contest Winner | | | | |
| | | | | | Winning Amount | | Total Won including their own entry fee |
| 4 | 1 | 54 | $100.00 | $5400.00 | $5400.00 | $25,000.00 | $30,500.00 |

FIGURE 13

Football

| Contest Details | Players | Entry Fee | Total Prizes Avail | 1/2 reserved for Daily | 1/2 for Winning Contest | | |
|---|---|---|---|---|---|---|---|
| | 250 | 100 | 25000 | 12500 | 12500 | | |

Weekly Round Progessions

| Round | Remaining Players | Eliminated Players | 1/2 Entry Fee | Available for Prizes | Per Player Payout | Remaining Available or Daily Prizes for next round | |
|---|---|---|---|---|---|---|---|
| 2 | 200 | 50 | $50.00 | $2500.00 | $12.50 | 10000 | |
| 3 | 165 | 35 | $50.00 | $1750.00 | $10.61 | 8250 | |
| 4 | 124 | 41 | $50.00 | $2050.00 | $16.53 | 6200 | |
| 5 | 82 | 42 | $50.00 | $2100.00 | $25.61 | 4100 | |
| 6 | 55 | 27 | $50.00 | $1350.00 | $24.55 | 2750 | |
| 7 | 31 | 24 | $50.00 | $1200.00 | $38.71 | 1550 | |
| 8 | 14 | 17 | $50.00 | $850.00 | $60.71 | 700 | |

Contest Winner

| | | | | Winning Amount | | Total Won including their own entry fee | |
|---|---|---|---|---|---|---|---|
| 9 | 1 | 13 | $50.00 | $650.00 | $650.00 | $12,500.00 | $13,200.00 |

FIGURE 14

METHOD OF CONDUCTING FANTASY SPORTS COMPETITIONS FOR MULTI-ROUND COMPETITIVE PLAY INCLUDING A UNIQUE PAYOUT STRUCTURE

CROSS REFERENCE TO RELATED U.S. PATENT APPLICATIONS

This application is a non-provisional of and claims the benefit under 35 U.S.C. § 119(e) of the earlier filing date of U.S. Provisional Application Ser. No. 62/860,636, filed on Jun. 12, 2019, which is hereby incorporated in entirety by reference.

BACKGROUND

1. Field of the Invention

The present invention relates to fantasy sports and, in particular, to methods, systems, and software for managing fantasy sports competitions, especially for providing a unique user bet payout structure for multi-round competitive gameplay.

2. Description of Related Art

Betting on sports and other events generates many billions of dollars annually. Casinos and online betting platforms, for example, are important attractions and destinations to prospective bettors. These betting arenas display the bets that a prospective bettor may make on various types of sporting events, competitions or other events. Bets are placed on most major sports including professional and college football, soccer, baseball, basketball, auto racing, and ice hockey, as well as cricket and rugby.

Further, bets are placed on various sports tournaments, including the NCAA Men's and Women's Basketball Championships and World Cup Soccer. Also, bets may be placed on other types of events including a selection of the winner of a reality television show (e.g., the Survivor reality show), election results, weather events, when the first person lands on Mars, the winner of the next United States Presidential election, or any other type of event.

In general, gambling is the wagering, or betting, of money or something of material value (referred to as "the stakes") on an event with an uncertain outcome with the primary intent of winning additional money and/or material goods. Typically, the outcome of the wager, or bet, is evident within a short period. The term "gaming" in this context typically refers to instances in which the activity has been specifically permitted by law. The two words are not mutually exclusive; i.e., a "gaming" company offers (legal) "gambling" activities to the public. This distinction is not universally observed in the English-speaking world, however.

For instance, in the UK, the regulator of gambling activities is called the Gambling Commission (not the Gaming Commission). Also, the word gaming is frequently used to describe activities that do not involve wagering, especially online. While almost any game can be played for money, and any game typically played for money can also be played just for fun, some games are generally offered in a casino setting. Gaming can also be accomplished for non-monetary prizes, such as credits, coupons or points, whether redeemable for money, merchandise or discounts and other promotional or recreational purposes.

Fixed odds betting and parimutuel betting frequently occur at many types of sporting events, and competitions of all sorts, including political elections. In addition, many bookmakers offer fixed odds on any number of non-sports related outcomes. For example, the direction and extent of movement of various financial indices, the winner of television competitions such as Big Brother, and election results are frequently the subject of wagers and bets.

Wagering may take place through parimutuel pools, non-parimutuel betting arrangements, or bookmakers may take bets personally. Parimutuel wagers, for example, pay off at prices determined by support in the wagering pools, while bookmakers pay off either at the odds offered at the time of accepting the bet; or at the median odds offered by track bookmakers at the time the race started.

Parimutuel betting (from the French language, Pari Mutuel or mutual betting) is a betting system in which all bets of a particular type are placed together in a pool, taxes and a house "take" or "vig" are removed by the gaming sponsor or organizer, and payoff odds are calculated by sharing the pool among all winning bets. In some countries, it is known as the Tote after the totalisator, which calculates and displays bets already made.

Parimutuel and/or non-parimutuel betting systems are utilized in gambling events, such as horse racing, greyhound racing, jai alai, etc., and most sporting events or competitions in which participants finish in a ranked order. Betting on team sports has become an important service industry in many countries. For example, millions of Britons play the football pools every week.

In addition to organized sports betting, both legal and illegal, there are many side-betting games played by casual groups of spectators, such as NCAA Basketball Tournament Bracket Pools, Super Bowl Squares, Fantasy Sports Leagues with monetary entry fees and winnings, and in-person spectator games like Caber Tossing. One can also bet with another person as to whether a statement is true or false, or that a specified event will happen (a "back bet") or will not happen (a "lay bet") within a specified time.

Fantasy sports provide participants the ability to play in daily, weekly, quarterly, season-long and playoff fantasy leagues across various sports, including National Football League (NFL), Major League Baseball (MLB), National Basketball Association (NBA), the National Hockey League (NHL), NASCAR and the Pro Golf Tour. Generally, a fantasy sports league (hereafter, fantasy league) is established in connection with a particular real-world professional sports league (e.g., in the U.S., National Football League, Major League Baseball, Major League Soccer), and participants in the fantasy league act as owners a fantasy sports team (hereafter, a fantasy team) that create and manage within the fantasy league.

Each fantasy team is composed of real-world players, which are selected by the fantasy team owner from the real-world professional sports league (e.g., NFL, MLB, NBA, NHL, and the like), often regardless of their real-world team affiliations. Once a participant has selected a league, they select the real-world players (e.g., for NFL football, you may select one quarterback, one running back, two wide receivers, one tight end, and one kicker) from the available players in the selected league to be on the participant's fantasy team.

Usually, the fantasy league season lasts for the length of the regular season of the real-world professional sports league to which it is associated. During the fantasy league season, the performance of the fantasy team is determined by the real-world performance (e.g., statistical performance, points scored, etc.) of the real-world players on the fantasy team.

Since real-world performance of an individual real-world player corresponds to player activity during real-world sports matches, during the fantasy league season, fantasy team owners actively manage their respective fantasy team rosters to maximize the performance their respective fantasy teams derive from the real-world sports matches that occur during the real-world regular sports season. At the end of the fantasy league season, the fantasy teams may be ranked (e.g., based on their respective overall performances) and one or more fantasy team owners may be declared winners of the league.

Unfortunately, traditionally formatted fantasy sports leagues provide little or no opportunity for alternative, more attractive payout structures, for leisure, amateur and professional gamblers alike. Accordingly, there is a need in the present art for alternative payout structures to encourage more widespread participation in fantasy sports betting.

BRIEF SUMMARY

The following summary of the present invention is presented to provide a basic understanding of some aspects of the invention and to facilitate an understanding of some of the innovative features unique to the disclosed embodiment, and it is not intended to be a full description. This summary is not intended to identify all key or critical elements of the invention or to delineate the entire scope of the invention. Its sole purpose is to present some concepts of the invention in a simplified form as a prelude to the more detailed description presented below. A full appreciation of the various aspects of the embodiments disclosed herein can be gained by taking the entire specification, claims, drawings, and abstract as a whole.

Reference throughout this specification to "one embodiment" or "an embodiment" means that a particular feature, structure, or characteristic described in connection with an embodiment is included in at least one embodiment of claimed subject matter. Thus, appearances of phrases such as "in one embodiment" or "an embodiment" in various places throughout this specification are not necessarily all referring to the same embodiment. Furthermore, particular features, structures, or characteristics may be combined in one or more embodiments.

It is, therefore, one aspect of the disclosed embodiments to provide systems and methods that allow users of remote communications and display devices to bet on the outcomes of various sporting events, competitions and other events or outcomes occurring during those events using bi-directional communications platform on the remote devices to communicate with a server over a data communications network.

It is another aspect of the disclosed embodiments to provide for systems and methods that allow users of remote devices to access betting competition platforms with alternative wager pot splitting or sharing schemes and other more enticing payout structures.

The aforementioned aspects and other objectives and advantages can now be achieved as described herein. Methods and systems for conducting a competition within a gaming environment. Two or more players can be enabled to electronically access a gaming environment over a communication network.

In yet another embodiment, a system for operating a gaming environment can be provided. Such a system can include, for example, at least one processor; and a computer-usable medium, embodying computer program code, the computer-usable medium capable of communicating with the at least one processor, the computer program code comprising instructions executable by the at least one processor and configured for: implementing a pot splitting scheme and additional modified payout structures.

Various embodiments described herein provide systems and methods for betting contests relating to sports matches and, in particular, relating to fantasy sports associated with sports matches. The systems and methods described herein can improve the interest and enjoyment of sports fans, and can improve the active participation of fantasy sports enthusiasts.

For some embodiments, the systems and methods described herein can provide a new format for playing fantasy sports for a fantasy sports season. Depending on the embodiment, this new format can take the place of, or be used in conjunction with, traditional forms of playing fantasy sports (e.g., operating a fantasy sports league).

In preferred embodiments, the present invention comprises a computer software implemented system designed to establish and operate a fantasy sports betting contest application platform designed to provide to a plurality of contestants an ability to participate in a multi-round betting contest, to provide to one or more contestants of the plurality of contestants an ability to collectively agree to split a first wager pot, upon the remaining number of contestants falling below a set threshold, and to provide to one or more contestants of the plurality of contestants comprising round winners an ability to participate in round-payouts from a second wager pot, where the computer software is executed on a plurality of computers, including a user interface, in conjunction with processors, memory, bus elements and a network connection.

The system of the present invention also comprises code establishing a betting contest system configured to establish, operate and maintain one or more betting contests, where each betting contest includes a plurality of contestants, two or more contest rounds, each associated with a plurality of real-world competitors scheduled to compete in a set of real-world competition events, up to one or more contestant round winners per contest round, and up to one or more contestant winners of the entire betting contest.

The betting contest system of the present invention comprises a contest management module, configured to establish, or create and initialize, the one or more betting contests, inclusive of specifying and setting one or more betting contest parameters, such as competition category, number of contest rounds, and amount of contest wager or entry fee, a contestant management module, configured to enter contestants into the betting contest and manage contestant profiles, preferences and default settings, and a user account module, configured to establish, or create and initialize, and associate one of a plurality of contestant user accounts with each contestant of the plurality of contestants in a given betting contest, and further configured to manage the plurality of user accounts associated with contestants in the given betting contest, including maintenance of account balances for all user accounts associated with the plurality of contestants, crediting and deducting amounts from the user account balances based on wagers, wager pots, and sets of round winners and contest winners determined for a betting contest.

The betting contest system of the present invention also comprises a contest wager module, configured to collect, receive and manage the contest wager or entry fee and contestant selections of and changes to selections of one or more competitors selected for a contestant fantasy sports team roster in a given betting contest by the plurality of contestants, and wherein once the set of real-world competition events begins, the competitor selections made by the plurality of contestants are locked and a contest wager pot module, configured to form a first wager pot and a second wager pot for a given betting contest, wherein the first and second wager pots comprise respective portions of the total wager entry fees for the plurality of contestants, less some percent retained by the house, and wherein the second wager pot is further divided among the rounds of the betting contest, and then further subdivided among the round winners.

The betting contest system of the present invention further comprises a sports player performance module, configured to obtain a set of performance metrics results for the plurality of selected competitors from two or more independent sources of competitor performance metrics information, and a contest outcome module, configured to identify sets of one or more round winners and one or more contest winners upon conclusion of a respective round or contest, by reviewing and comparing sets of performance metrics results provided by the sports player performance module, and to determine one or more sets of contestant winners based on the contestant winners having a fantasy score higher than the house fantasy score for the given round or contest.

Additionally, though various embodiments described herein are done so with respect to betting contests or fantasy sports, it will be understood that various embodiments need not be associated with real-world gambling. Indeed, various embodiments described herein can be readily utilized in conducting competition between two or more participants without need for wagering money or items of material value on the competition.

Some embodiments provide for a method that performs various steps and operations described herein, or provide for a computer program product comprising a computer readable medium having computer program code (i.e., executable instructions) executable by a digital processor to perform various steps and operations described herein.

These and other aspects of the present invention are realized in an improved system and method designed to facilitate management of fantasy sports game and league play, as shown and described in the following figures and related description.

Additional features and advantages of the invention will be set forth in the detailed description which follows, which, taken in conjunction with the accompanying drawings, by way of example, together illustrate the features of the present invention, which will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention. The figures are provided for purposes of illustration only and merely depict typical or example embodiments. These drawings are provided to facilitate the reader's understanding and shall not be considered limiting of the breadth, scope, or applicability various embodiments.

Non-limiting and non-exhaustive features will be described with reference to the following figures, wherein like reference numerals within the detailed description refer to like parts throughout the various figures. The figures described below were not intended to be drawn to any precise scale with respect to size, angular relationship, or relative position. Various embodiments of the present invention are shown and described in reference to the numbered drawings wherein:

FIG. 1A illustrates a high-level block diagram of an exemplary terminal or client device, comprising a digital data processing and remote communications device.

FIG. 1B illustrates an exemplary environment for operations and devices, which may include a digital data processing and remote communications device, a data communications network and one or more servers.

FIG. 11 illustrates a table portraying the payout structure for an exemplary betting competition based on a baseball fantasy sports format.

FIG. 12 illustrates a table portraying the payout structure for an exemplary betting competition based on a basketball fantasy sports format.

FIG. 13 illustrates a table portraying the payout structure for an exemplary betting competition based on a Golf fantasy sports format.

FIG. 14 illustrates a table portraying the payout structure for an exemplary betting competition based on a based on a baseball fantasy sports format. In these figures, the contestants are referred to as players.

Figure 2A:
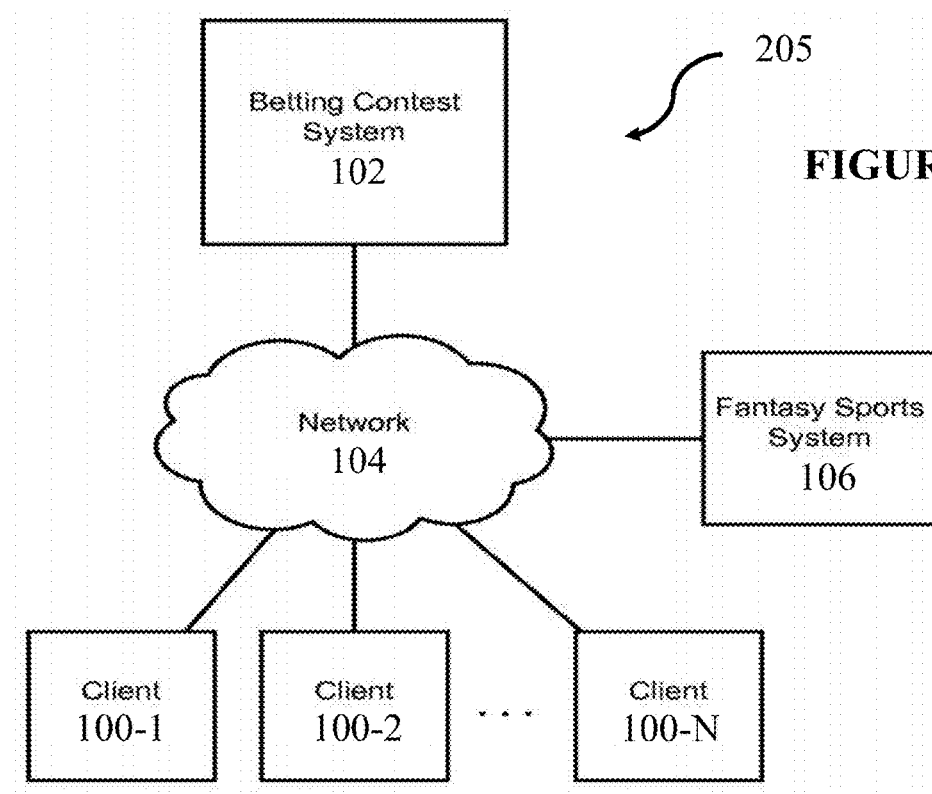
FIG. 2A illustrates another exemplary embodiment of a network system that includes a betting contest system, a network, a fantasy sports system, and client devices.

It will be appreciated that the figures are illustrative and not limiting of the scope of the invention, which is defined by the appended claims. The embodiments shown accomplish various aspects and objects of the invention. It is appreciated that it is not possible to clearly show each element and aspect of the invention in a single figure, and as such, multiple figures are presented to separately illustrate the various details of the invention in greater clarity. Similarly, not every embodiment need accomplish all advantages of the present invention. The figures are not intended to be exhaustive or to limit the embodiments to the precise form disclosed. It should be understood that various embodiments may be practiced with modification and alteration.

DETAILED DESCRIPTION

The present invention is of a method, system, and computer software embodied on non-transitory computer-readable media for engaging in fantasy sports betting activities. Various embodiments described herein provide systems and methods for establishing and managing a betting contest and, in particular, conducting betting contests in association with a plurality of real-world sports players scheduled to participate in real-world sports matches, such as exhibition games, regular season games, championships, and the like.

In particular embodiments, systems and methods manage or otherwise facilitate a betting contest, for two or more contest participants, where the betting contest is associated with fantasy sports based on real-world sports matches. The particular values and configurations discussed in these non-limiting examples can be varied and are cited merely to illustrate at least one embodiment and are not intended to limit the scope thereof. The embodiments will now be described more fully hereinafter with reference to the accompanying drawings, in which illustrative embodiments of the invention are shown.

The various embodiments of the invention will now be described more fully hereinafter with reference to the accompanying drawings, in which illustrative embodiments of the invention are shown, so as to enable one skilled in the art to practice the present invention. These, and other, aspects and objects of the present invention will be better appreciated and understood when considered in conjunction with the following description and the accompanying drawings.

It should be understood, however, that the following description, while indicating preferred embodiments of the present invention and numerous specific details thereof, is given by way of illustration and not of limitation. The drawings and following description are exemplary of various aspects of the invention and are not intended to narrow the scope of the appended claims. Many changes and modifications may be made within the scope of the present invention without departing from the spirit thereof and the invention includes all such modifications.

The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Throughout the entirety of the present disclosure, use of the articles "a" or "an" to modify a noun may be understood to be used for convenience and to include one, or more than one of the modified noun, unless otherwise specifically stated.

As used herein, the term "set" may refer to any collection of elements, whether finite or infinite. The term subset may refer to any collection of elements, wherein the elements are taken from a parent set; a subset may be the entire parent set. The term proper subset refers to a subset containing fewer elements than the parent set.

As used herein, the terms "contestant", "contest participant" and "participant" are used interchangeably to indicate a user of the betting competition platform wagering services. Further, as used herein, the terms "sports player" and "competitor" are used interchangeable to indicate a competitor in a competition or other event on which a wager may be placed, regardless of whether that competition or event is a sports event. Furthermore, as used herein, the terms "betting contest" and "betting competition" are used interchangeably and should be interpreted to have a common meaning.

As utilized herein the term "module" generally refers to a collection or routines (and/or subroutines) and/or data structures that performs a particular task or implements a particular abstract data type. Modules usually include two parts: an interface, which lists the constants, data types, variables, and routines that can be accessed by other modules or routines; and an implementation, which is typically, but not always, private (accessible only to the module) and which contains the source code that actually implements the routines in the module. The term "module" may also refer to a self-contained component that can provide a complete function to a system and can be interchanged with other modules that perform similar functions.

Additionally, it will be appreciated that a "module" may comprise software, hardware, firmware, and/or circuitry. In one example one or more software programs comprising instructions capable of being executable by a processor may perform one or more of the functions of the modules described herein. In another example, circuitry may perform the same or similar functions.

Alternative embodiments may comprise more, less, or functionally equivalent modules and still be within the scope of present embodiments. For example, the functions of the various modules may be combined or divided differently. Various embodiments are described herein as examples. It will be apparent to those skilled in the art that various modifications may be made and other embodiments can be used.

As will be appreciated by one skilled in the art, the present invention can be embodied as a method, data processing system, or computer program product. Accordingly, the present invention may take the form of an entirely hardware embodiment, an entirely software embodiment or an embodiment combining software and hardware aspects all generally referred to herein as a "circuit" or "module."

Furthermore, the present invention may take the form of a computer program product on a non-transitory computer-usable storage medium having computer-readable program code embodied in the medium. Any suitable computer readable medium may be utilized whether now known or hereafter devised, including hard disks, USB Flash Drives, DVDs, CD-ROMs, optical storage devices, magnetic storage devices, etc.

Computer program code for carrying out operations of the present invention may be written in an object oriented programming language (e.g., Java, C++, etc.). The computer program code, however, for carrying out operations of the present invention may also be written in conventional procedural programming languages, such as the "C" programming language or in a visually oriented programming environment, such as, for example, Visual Basic. The program code may execute entirely on the user's computer, partly on the user's computer, as a stand-alone software package, partly on the user's computer and partly on a remote computer or entirely on the remote computer.

In the latter scenario, the remote computer may be connected to a user's computer through a local area network (LAN) or a wide area network (WAN), wireless data network e.g., WiFi, Wimax, 802.xx, and cellular network, or the connection may be made to an external computer via most third party supported networks (for example, through the Internet using an Internet Service Provider).

The invention is described in part below with reference to flowchart illustrations and/or block diagrams of methods, systems, computer program products, and data structures according to embodiments of the invention. It will be understood that each block of the illustrations, and combinations of blocks, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus create means for implementing the functions/acts specified in the block or blocks.

These computer program instructions may also be stored in a computer-readable memory that can direct a computer or other programmable data processing apparatus to function in a particular manner, such that the instructions stored in the computer-readable memory produce an article of manufacture, including instruction means which implement the function/act specified in the block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Steps of the process, which may be stored as software code instructions within one or more non-transitory computer readable medium and performed by a processor connected thereto, as part of a method executed by one or more computer systems comprising an interlinked computer network, in a variety of different orders of operation, may include user registers, user sets up account profile, user selects sport, user establishes or sets up contests and/or account triggers, user selects competition type, user selects teams and players, user selections played against the house, move users that beat the house to the next round, remove users that lose to the house from the competition, user sign-out, user login, user stats check, user selects new competition, user selects new players or teams, process continues.

In some embodiments, a system and methods of the present invention, i.e., the betting competition platform) may include, for example, a processor and a data bus coupled to the processor. Such a system may also include a computer-usable medium embodying computer code, the computer-usable medium being coupled to the data bus, the computer program code comprising instructions executable by the processor.

Such instructions may be configured to, for example, electronically place at least one bet with respect to at least one event during an associated round of betting; and manage and control the at least one wager or bet during the particular round of betting. In yet another embodiment, such instructions can be configured for managing and controlling via a microcontroller or other computer processor the at least one wager with respect to the at least one round of betting.

The present invention further provides a method for conducting a betting competition via a fantasy sports betting platform, within an online gaming environment in accordance with a preferred embodiment. A method or process step or logical operation man be implemented to enable at least two players to electronically access a gaming environment over a communication network (e.g., the Internet, wireless networks, etc.). The at least two players can be registered, as indicated at block 14, to allow them access to the competition within the gaming environment.

A further step or logical operation can be implemented to determine at the conclusion of the competition at least one winner (e.g., one or more winners) based on an accumulation of fantasy points and total fantasy score for the at least two players during the competition. Note that in some embodiments, a step or logical operation can be implemented for authorizing at least one player among the at least two players to access the gaming environment upon an electronic payment of a fee by the at least one player and confirmation of an identity of the at least one player.

In another embodiment, a system for conducting a competition within a gaming environment can be implemented. Such a system can include, for example, at least one processor; and a computer-usable medium embodying computer program code, the computer-usable medium capable of communicating with the at least one processor, the computer program code comprising instructions executable by the at least one processor and configured for: enabling at least two players to electronically access a gaming environment over a communication network; registering the at least two players to allow access to a competition within the gaming environment; enabling each player among the at least two players to compete against the house by selecting from a set of at least two events displayed in the gaming environment one or more event outcomes; wherein a selection of at least two outcomes in the at least two events may require an entry fee of some fixed amount of money, points or credits, wherein each selection of an outcome increases a contestant's balance if the outcome occurs or decreases the contestant's balance if the outcome selected does not occur; and determining at a conclusion of the competition at least one winner based on a fantasy score derived from accumulation of fantasy points by the selected sports players by the at least two competing contestants.

In yet another embodiment, a system for operating a gaming environment can be provided. Such a system can include, for example, at least one processor; and a computer-usable medium embodying computer program code, the computer-usable medium capable of communicating with the at least one processor, the computer program code comprising instructions executable by the at least one processor and configured for: accessing a gaming environment by at least one contestant, wherein contestants compete against one another and against the house in at least one betting competition provided in the gaming environment by betting on at least one sporting event or contest from among at least two sporting events or contests; registering the at least one contestant with access to one or more betting competitions; allowing the at least one player to place bets on the at least one event in at least one game; and determining at least one winner based on an individual fantasy score derived from accumulation of fantasy points by the one or more selected sports players of the plurality of sports players.

With this approach an online fantasy sports betting competition can be provided, which allows participants to place bets. At the end of the event or a series of events in which the player participates (or has the ability to participate), the fantasy points are added up to determine a a total fantasy score for each participant and winner(s) are declared.

It will be appreciated that variations of the above-disclosed and other features and functions, or alternatives thereof, may be desirably combined into many other different systems or applications. For example, it can be appreciated that the betting approach disclosed herein does not have to be parimutuel but can also be implemented as betting in which odds are set by a controller (e.g., sort of "house odds). That is, "parimutuel" is just one particular betting approach, but not the only betting system or approach that can be utilized in accordance with the disclosed embodiments.

For a given betting contest, each contest participant may select one or more sports players (e.g., a quarterback) from a set of real-world sports players (e.g., a set of quarterbacks) that will be participating in a set of real-world sports matches scheduled to take place over a period of time associated with the given betting contest. Each contest participant may further wager on the selected sports players performing better than the others in the plurality of real-world sports players (herein also referred to as sports players).

At the end of a given betting contest, based on the performance of their respective (selected) sports player(s), each contest participant that beats the house may win a portion of the wager pot. For some embodiments, one or more ranked winners may be declared based on their respective total fantasy points or fantasy score at the end of a set of betting contests.

In some instances, each contest participant may pay a flat fee to enter the set of betting contests and, in exchange for paying the flat fee, each contest participant can place a wager to a betting contest wager pot (i.e., "wager" against the house and other contest participants) that is associated with one of the betting contests in the set of betting contests. A contest participant may place a wager to the wager pot of a betting contest prior to the commencement of the betting contest.

Each contest participant may select one or more real-life sports players for each betting contest. For example, each contest participant may select one quarterback from a set of quarterbacks scheduled to play during the time period of the betting contest, may select one wide receiver from a set of wide receivers scheduled to play during the time period of the betting contest, or may select one kicker from a set of kickers scheduled to play during the time period of the betting contest. Contestants among the plurality of contest participants in any given betting contest may also comprise contest participants in one or more other betting contests being managed by the betting competition platform.

In some embodiments, each contest participant may select five real-life players for a roster for the betting contest—one quarterback, one wide receiver, one tight end, one kicker and one running back. Depending on the embodiment, each contest participant selects the real-life players based on the contest participant's knowledge of the athlete and the athlete's anticipated performance.

Prior to each betting contest, contest participants may have the ability to place a wager in connection with the anticipated performance of the contestant's fantasy sports team roster for a given betting contest. At the conclusion of each betting contest, contest participants may earn winnings (e.g., money, points or credits, etc.) or realize losses based on the performance of his or her roster during the betting contest.

For some embodiments, the systems and methods described herein establish and conduct one or more betting contests based on the performance of individual real-world sports players. Additionally, for some embodiments, the performance of an individual real-world sports player is determined using fantasy sports points (hereafter, fantasy points) attributed to the individual real-life sports player by one or more fantasy sports systems (or platforms), such as fantasy sports hosting sites offered by Yahoo®, ESPN®, CBS®, Fox Sports®, and the like.

As used herein, a fantasy sports score (hereafter, fantasy score) for an individual real-world sports player can represent the fantasy points that the individual real-world sports player has earned or produced based on their real-world performance during one or more sports matches.

For a given betting contest, each contest participants may select one or more sports players (e.g., a quarterback) from a set of real-world sports players (e.g., a set of quarterbacks) that will participate in a set of real-world sports matches (herein after also referred to as sports matches) scheduled to take place over a period of time associated with the given betting contest. Each contest participant may further wager some of their money, points or credits (e.g., as available in their contestant account) on the selected sports teams and/or player(s) to perform better than the others in the plurality of real-world sports events.

For some embodiments, one or more contest winners are declared based on their respective total balance of fantasy score/points having beaten the corresponding house total balance of fantasy score/points at the end of a betting contest. A first plurality of sports players may comprise sports players of two or more sports teams and/or arbitrary positions within a given sports team. Alternatively, the first plurality of sports players may comprise sports players of a single sports team, of a specific squad or team in a sports team (e.g., receivers, running backs, special teams, etc.), or players of a particular position on the sports team (e.g., kicker, center, quarterback, punter, etc.).

The systems or methods form, for a betting contest, a wager pot comprising a plurality of wagers placed by the plurality of contest participants on a first plurality of selected sports players, selected from the first plurality of sports players by the contest participants or contestants.

In some embodiments, each participant may only place one wager. In other embodiments, each wager (e.g., or a set of wagers) in the plurality of wagers may correspond to one contestant of the plurality of contest participants and also to one or more sports players in the first plurality of selected sports players, selected by the respective contestant. In further embodiments, in particular in winner-takes-all scenarios, participants may each place multiple wagers in the wager pot (i.e., pay multiple entry fees to enter the betting competition multiple times). The systems or methods may receive a first plurality of performance metrics and or fantasy points relating to the first plurality of selected sports players, during or after expiration of a first time period associated with the (first or subsequent rounds) of the betting contest.

The first set of real-world sports matches may be associated with car racing, football, basketball, baseball, hockey, soccer, golf. Additionally, the first time period may comprise to a day, a week, a month, or a sports season.

When forming the wager, for each given participant of the plurality of contest participants or contestants, the systems or methods may receive a communication or other indication of one or more selected sports players chosen from among the first plurality of sports players, thereby including the one or more sports players as part of the first plurality of selected sports players of a respective contestant.

For each given contestant of the plurality of contest participants, the systems or methods may receive from the given contestant an instruction for placement of a wager (e.g., an entry fee) to enter a betting competition. The subject of the wager is essentially a betting competition between the fantasy score of, or total fantasy points accrued by, the one or more sports players selected by contestant and those selected by the house.

The instructions may further include directives for participation in a first round based on one or more sports players selected by the participant and monitored for performance metrics as part of the plurality of selected sports players. The betting competition may comprise a single round or multiple rounds of competitive play. In all cases, the betting competition is based on one or more sports players or competitors selected by the contestant and monitored for performance metrics as part of the first plurality of selected sports players.

For each given participant of the plurality of contest participants, the systems or methods may transfer the money, points or credits wagered by the participant or contestant from the associated account of the given contestant to the wager pot. In preferred embodiments the amount wagered by each participant is a flat fee comprising the same cost or charge (e.g., money, points, credits, etc.) as a betting competition entry fee to each contest participant.

The systems or methods may identify, from the plurality of contestants, a first set of contest winners for the betting contest based on the first plurality of fantasy score/points and/or performance metrics (e.g., touchdowns, yards carried, or yards passed by a football player). Contestant fantasy scores must beat the house fantasy score to win. In some embodiments the first set of contest winners may comprise a single contestant, and in other embodiments the first set of contest winners may comprise a plurality of contestants who have each beaten the house fantasy score for the given contest or round of betting.

The systems or methods may update the associated winnings (e.g., money, points, credits, etc.) of each contestant of the plurality of contest participants based on a first set of contest winners, and outcomes (i.e., balance) of the wager pot.

The systems or methods may update the associated account balance (e.g., money, points or credits winnings) of each contestant of the plurality of contest participants based on the first set of contest winners, the plurality of wagers, and the outcomes (i.e., balance) of the wager pot, by transferring money, points or credits, etc., between the wager pot and associated account of each contestant of the plurality of contest participants based on the plurality of wagers by the plurality of contestants (i.e., delivering the appropriate money, points or credits winnings).

For some embodiments, the method is performed for each round of a betting contest in the plurality rounds of the betting contest. For instance, the systems or methods may establish a betting contest having multiple rounds of competitive play associated with the plurality of contest participants and a second and subsequent (e.g., third, fourth, fifth, etc.) plurality of sports players scheduled to play in a second and subsequent (e.g., third, fourth, fifth, etc.) sets of real-world sports matches over a second and subsequent (e.g., third, fourth, fifth, etc.) time period.

For embodiments including multi-round betting contests, the systems or methods may enable the contestants to form second and subsequent (e.g., third, fourth, fifth, etc.) fantasy sports team roster based on a second and subsequent (e.g., third, fourth, fifth, etc.) plurality of selected sports players chosen from the second and subsequent (e.g., third, fourth, fifth, etc.) plurality of sports players selected by the respective contestants.

The second plurality of sports players may comprise sports players of any sports team or any position within a sports team. Alternatively, the second plurality of sports players may comprise sports players of a single sports team, of a specific squad or team in a sports team (e.g., receivers, running backs, special teams, etc.), or players of a particular position on the sports team (e.g., kicker, center, quarterback, punter, etc.).

For embodiments including multi-round betting contests, the systems or methods may form a second wager pot, comprising a portion of the fees collected from the wagers placed by the plurality of contest participants or contestants. In some embodiments, the second wager pot is paid out in one or more round prizes over the course of the multi-round betting contest.

In preferred embodiments the second wager pot may comprise a range from twenty percent (20%) to eighty percent (80%) of the total entry fees. In embodiments having a second wager pot, the contest pot becomes a first wager pot comprising the reciprocal portion or remainder of the total entry fees.

In preferred embodiments, the total entry fees of the contest participants (less some set percent taken as betting competition house commission) are split equally between the first and second wager pots, with the first wager pot reserved as prize winnings for, e.g., all contestants winning the final round of the betting competition, ranked winners of the final round of the betting competition, ranked winners of all rounds of the betting competition, special prizes and other purposes.

In some of these preferred embodiments, the second wager pot may further be reserved as prize winnings for, e.g., all contestants winning a round of the competition, unranked winners of a round of the competition, unranked winners of the final round of the betting competition, special prizes and other purposes.

In some embodiments, the second wager pot is divided equally among all rounds of the betting competition, and further divided equally among all winners of a given round of the betting competition. In other embodiments, the second wager pot is divided equally among all rounds of the betting competition, except for the final round, which does not receive a share of the second pot—this arrangement is useful for embodiments where the first wager pot is reserved as winning prizes for the final round.

A round prize may simply comprise an portion of the second pot divided equally by the number of rounds in the betting competition, further divided by the number of winning contestants in any given round. Alternatively, round prizes may be divided based on a ranked order, including larger money prizes for the highest ranked contestants, and an equal split of the remainder of the second wager pot round payout amongst the rest of the winning contestants who do not receive a ranking (but who have beaten the house).

The systems or methods may receive a second (or subsequent) plurality of performance metrics and or fantasy points relating to the second plurality (or subsequent pluralities) of selected sports players, during or after expiration of a second (or subsequent) time period associated with the second (or subsequent) round(s) of the betting contest.

The systems or methods may identify, from the plurality of contest participants, a second or subsequent (e.g., third, fourth, fifth, etc.) set of contest winners for the second or subsequent (e.g., third, fourth, fifth, etc.) rounds of the betting contest based on the second plurality of fantasy points and/or performance metrics. The systems or methods may update the associated account balance (e.g., money, points or credits winnings) of each participant of the plurality of contest participants based on a second or subsequent (e.g., third, fourth, fifth, etc.) set of contest round winners, and outcomes (i.e., balance) of the second wager pot.

Additionally, the second set of real-world sports matches may be associated with car racing, football, basketball, baseball, hockey, soccer, golf. Depending on the embodiment, the second time period may comprise to a day, a week, a month, or a sports season.

When forming the fantasy sports team rosters for a second and subsequent rounds (e.g., third, fourth, fifth, etc.), for each contestant of the plurality of contest participants, the systems or methods may receive a communication or other indication of one or more selected sports players chosen from among the second or subsequent (e.g., third, fourth, fifth, etc.) plurality of sports players, thereby including the one or more sports players as part of the second or subsequent (e.g., third, fourth, fifth, etc.) plurality of selected sports players chosen by the respective contestant.

For each given contestant of the plurality of contest participants, the systems or methods may receive from the given contestant an instruction for participation in a second and subsequent rounds (e.g., third, fourth, fifth, etc.), based on one or more sports players selected by the participant and monitored for performance metrics as part of the second and subsequent (e.g., third, fourth, fifth, etc.) plurality of selected sports players.

In some embodiments, the set of performance metrics are based on or comprise one or more fantasy points relating to the second and subsequent (e.g., third, fourth, fifth, etc.) plurality of selected sports players. For example, the one or more fantasy points may be provided by one or more fantasy sport systems, which may be offered by Yahoo®, CBS®, ESPN®, and the like.

In embodiments having a second wager pot, for each given participant of the plurality of contestants, the systems or methods may transfer a portion of the money, points or credits wagered by the contest participant as an entry fee to join the betting competition from the associated account of the given participant to the second wager pot.

The systems or methods may pay contestants from the second wager pot before or after updating the associated account balance (e.g., money, credits, points, etc.) of each participant of the plurality of contest participants based on the set of winners of a particular betting competition round, the plurality of wagers, and the balance of the second wager pot.

When updating the associated account balances, the systems or methods may identify a set of contest/round winners who have beaten the house and pay each winner from one or more of the first and second wager pots. Alternatively, the system and methods may identify a first place winner in the set of contest participants based on a first performance metric of the first plurality of performance metrics corresponding to the sports player(s) in the plurality of selected sports players selected by the first place winner.

The systems or methods may update the first and/or second wager pots and the associated account balances of the winner(s) based on one or more wagers in the plurality of wagers corresponding to the winner(s). Updating the associated account balances may further comprise identifying winner(s) in the set of contest participants based on a cumulative total of one or more subsequent (e.g., second, third, further, fifth, etc.) performance metrics of the first plurality of performance metrics corresponding to a first (or additional, e.g., second, third, fourth, fifth, etc.) sports player(s) in the plurality of selected sports players selected by the winner (s).

Additionally, for some embodiments, a plurality of the contest participants having fantasy scores or fantasy points balances that have beaten the house score (e.g., 1st, 2nd, and 3rd highest points balances) are determined to be the winners of the betting contest. Conversely, if no contest participants score higher than the house, then there are no winners for the contest.

Further, in some embodiments, a winner is determined at the end of each betting contest based on the total balance of their fantasy score/points, or a set of winners is determined at the end of each betting contest based on their respective total fantasy score and fantasy points balance.

A unique method of sharing the pot further sets this invention apart from all others. It is convenient to offer split the pot at or below some maximum threshold percentage of players remaining. For instance, split the pot could be offered in the round of play following the percentage of remaining users falling below half or less than fifty percent (<50%).

However, in a preferred embodiment split the pot is not offered, in a given contest, until there are 10% or fewer users remaining, at which point they are all prompted to choose whether to end the contest early and split the pot.

Different versions of split the pot may include a majority or supermajority rules criteria, where, so long as some threshold percentage of the remaining users all vote in favor of splitting the pot, the pot will be split equally among the remaining players and the contest will end early. However, in a preferred embodiment all users must agree in unanimous consent for the function to work, otherwise the contest will proceed unabated to the next round.

Ideal duration for a round of gameplay may vary by sport to optimize the fantasy gameplay. For instance, a new round may start next day or the next week, depending on the type of the contest provided. After each round with less than ten percent (<10%) of users remaining, the system of the present invention will always prompt the users to collectively to end the contest early and split the pot.

Users are not obligated to accept this alternative end to a contest, and the split the pot option is provided as a means to increase users' chances of winning. For multi-round betting competitions, contest rounds continue until there is either an outright winner at or before the expiration of a contest, multiple winners at the expiration of a contest, or multiple winners before the expiration of a contest when the remaining users decide to split the pot, e.g., under the ten percent (10%) condition.

When the remaining users decide to split the pot, some percent (e.g., one percent (1%)) of that split pot may be donated to a charity. This 1% charitable donation may be used to entice users to choose to split the pot. In some embodiments of the present invention, the split-pot winners may select the charity. In other embodiments of the present invention, the house selects the charity.

Additionally, in embodiments of the present invention that include winners or prospective winners choosing the charity, the (prospective) winners may be provided with a selection of at least two charities. The charity that receives most votes from the (prospective) winners will receive the charitable donation. However, in the event of a tie vote, the donation could be split between the two charities or a runoff vote could be held. These charitable donation scenarios may apply exclusively to pots split based on user selection.

In a preferred embodiment of the present invention, in the very first round of a fantasy competition, users will be able to select from two real world events by selecting a set of wild cards configured to enhance or degrade their point totals. In certain preferred embodiments, users will select either four or five (4 or 5) players from one or more additional teams. The house may display its selected wild card players.

In certain other preferred embodiments, wild card player selections are required only for the very first round and are not offered in subsequent rounds. The house may provide the contestants with a prepopulated list of available wild card players. In other preferred embodiments, the house provides users with a pre-selected list of choices of between 2 to 100 different wild card players. In some embodiments, contestants may be enabled to select multiple wild card players. In others, only a single wild card player selection is allowed. The house also picks the same number of wild card players from the pre-populated set of wild card player selections.

For embodiments that require selection of a team, a wildcard is implemented in a first round of the betting contest that requires selection of a wild card sports player from a second team, different than the team selected as the competing team. In these embodiments, the wildcard sports player's fantasy points are added to the fantasy score for the contestant to determine ultimate outcomes of the first betting contest round. In some other embodiments, wild card players may be employed in one or more subsequent rounds.

In certain preferred embodiments, the users must select a wild card player from a different team than the team of the players selected by the user for play in the particular round, i.e. in preferred embodiments, the first round. For football contests, the wild card players may be kickers, or special teams. For basketball, the wild card players may be top rated players and/or specific positions. For baseball, the wild card players may include top projected pitchers for the basic unit of competition time (e.g., day, week, month, etc.)

Further, in another preferred embodiment of the present invention, the house may host an unlimited-entry, winner-takes-all, double-elimination survivor pool competition, e.g., at the beginning of every season for football. For baseball and basketball, the house may run an unlimited-entry, winner-takes-all, double-elimination survivor pool once every 30 days. Double elimination means each entry gets two chances to win. In successive rounds of double elimination play, the house may show fewer house player picks in each subsequent round.

For these preferred embodiment, winner-takes-all competitions, the house may announce the prize total and unlimited number of user entries up front to entice more users to join the competition.

For versions of these preferred embodiment, winner-takes-all competitions that allow multiple entries per user, the house may possibly cap the number of entries per user at some reasonable number of entries (e.g., between 1 and 100 entries). Registration of new entries will be cut off at some buffer time period (e.g., 48 hours) prior to commencement of the competition play. Play will continue until a single winner emerges, or multiple prospective winners remain at the end of competition play, in which case the pot may be split in accordance with the number of prospective winning entries remaining.

Referring now to FIG. 1A, an exemplary digital data processing and remote communications device 100, i.e., a terminal or client device (hereinafter the "client device"), is shown. The client device 100 includes data processing systems and modules designed to provide access to a betting competition platform via a wagering module/database environment that may be implemented or included in devices operating in accordance with some embodiments of the present invention. As illustrated, the client device 100 includes a processor 138, a memory 136, and input/output circuits 146. The client device 100 may comprise or be incorporated in, for example, a personal computer, a portable wireless hand held device (e.g., Smartphone, etc.), server, router, or the like.

The processor 138 communicates with the memory 136 via an address/data bus 148 and communicates with the input/output circuits 146 via an address/data bus 149. The input/output circuits 146 can be used to transfer information between the memory 136 and another computer system or a network using, for example, an Internet Protocol (IP) connection and/or wireless or wired communications. These components may be conventional components such as those used in many conventional data processing systems, which may be configured to operate as described herein.

In particular, the processor 138 can be any commercially available or custom microprocessor, microcontroller, digital signal processor or the like. The memory 136 may include any memory devices containing the software and data used to implement the functionality circuits or modules used in accordance with embodiments of the present invention. The memory 136 can include, but is not limited to, the following types of devices: cache, ROM, PROM, EPROM, EEPROM, flash memory, SRAM, DRAM and magnetic disk. In some embodiments of the present invention, the memory 136 may be, for example, a content addressable memory (CAM).

As further illustrated in FIG. 1A, the memory 136 may include several categories of software and data used in the client device 100: an operating system 152; application programs 154; input/output device drivers 158; and data storage system 156. As will be appreciated by those of skill in the art, the operating system 152 may be any operating system suitable for use with a data processing system, such as, for example, Linux, Windows XP, Mac OS, Unix, etc.

The input/output device drivers 158 typically include software routines accessed through the operating system 152 by the application programs 154 to communicate with devices such as the input/output circuits 146 and certain memory 136 components. The application programs 154 are illustrative of the programs that implement the various features of the circuits and modules according to some embodiments of the present invention. Finally, the data storage system 156 stores and represents static and dynamic data that can be used by the application programs 154, the operating system 152, the input/output device drivers 158, and other software programs that may reside in the memory 136.

As illustrated in FIG. 1A, the data 156 may include, for example, statistics 128 and event information 130 for use by the circuits and modules of the application programs 154 according to some embodiments of the present invention as discussed further herein. The event information, for example, may include data associated with a particular event. Statistics may include, for example, not only statistical information related to a particular event, but also broader statistics, such as, for example, team history and sports scores.

In the embodiment shown in FIG. 1A, applications programs 154 can include, for example, a wagering or betting module 122, a security or authentication module 124, a tracking module 126, and so forth. While the present invention is illustrated with reference to the betting module 122, the authentication module 124, and the tracking module 126 being application programs in FIG. 1A, as will be appreciated by those of skill in the art, other configurations fall within the scope of the present invention. For example, rather than being application programs 154, these modules may also be incorporated into the operating system 152 or other such logical division of the client device 100.

Furthermore, while betting module 122, the authentication module 124, and the tracking module 126 are illustrated in a single data processing system, as will be appreciated by those of skill in the art, such functionality may be distributed across one or more data processing systems. Thus, the present invention should not be construed as limited to the configuration illustrated in FIG. 1A and may be provided by other arrangements and/or divisions of functions between data processing systems. For example, although FIG. 1A is illustrated as having various circuits/modules, one or more of these circuits may be combined without departing from the scope of the present invention.

Referring now to FIG. 1B, an exemplary network environment 205 for operations and devices according to some embodiments of the present invention will be discussed. As illustrated in FIG. 1B, the environment 205 may include a digital data processing and remote communications device (i.e., the client device 100), a data communications network 104, a first server 240, and a second server 245. It can be appreciated that additional servers may be utilized with respect to network 104.

It can also be appreciated that in some embodiments, only a single server, such as server 240 may be required. In general, the client device 100 allows a user of the client device 100 to bet on the outcomes of various sporting events, competitions and other events utilizing bi-directional client device 100 with one or more servers 235, 240, etc., over the data communications network 104.

As illustrated, the client device 100 illustrated in FIG. 1B may include the betting module or wagering module or system 122 according to some embodiments of the present invention discussed above with respect to FIG. 1A. For example, the application programs 154 discussed with respect to FIG. 1A could be included as part of the betting module 122 of the client device 100. The client device 100 may be, for example, a laptop computer, a desktop computer, a personal data assistant (PDA), Smartphone, a web capable mobile terminal or any device capable of communicating with the network 104.

The client device 100 may include, for example, a display and graphical user interface 244, which may be used to enter wagers according to some embodiments of the present invention, and a web browser 215 that may be accessed through the display and graphical user interface 244, according to some embodiments of the present invention. As discussed above, the wagering system module 122 may be configured to permit a user to place bets via the client device 100. The first server 240 may include a database 230 and the second server 245 may include a database 235.

The client device 100 may communicate over the network 104, for example, the Internet, through a wireless communications link, an Ethernet connection, a telephone line, a digital subscriber link (DSL), a broadband cable link, other wireless links, etc. The first and second servers 240 and 245 may also communicate over the network 104. Thus, the network 104 may convey data between the client device 100 and the first and second servers 240 and 245. The network 104 can be, for example, a wireless communications network, such as, for example, a cellular communications network or 802.11/WiFi network. The network 104 can also be a client-server network.

The client device 100 can be, for example, a desktop computer, a laptop computer, a set-top box, or portable wireless handheld devices such as a Smartphone and/or PDA. The client device 100 can also be, for example, a device such as an iPad type computing device.

The system and methods of the present invention may further include a process for performing logical operational steps to enable one or more remote device users to wager on games via data network access to a gaming environment or betting platform (e.g., eSports, eGaming, Fantasy Sports, etc.), in accordance with the disclosed embodiments.

In general, a user of the client device 100 may wager on one or more outcomes (discreet and cumulative) that result from the conduct of a sporting event, competition or other type of event, via access to network servers 235 and/or 240, etc. over the data network 104.

The system and methods of the present invention may further include a process for performing logical operational steps to enable authentication of a user of a remote computing device, in accordance with the disclosed embodiments. A secure identification can be established to permit a user of the client device 100 access to one or more of the servers 240, 245, etc., through the network 104 via the authentication module 124. Next, the user/authorized party is provided with secure and remote access to one or more of the servers 240, 245, etc., for placing bets via the client device 100.

The user of the client device 100 can then enter his or her secure identification via the client device 100. Remote access can then be granted to the user if his or her identification information is confirmed. Remote access can to one or more of the servers 240, 245, etc., via the network 104 includes, for example, access to statistics and event data. Such information can be utilized by the user in consideration for placing his or her bets with respect to a specific event outcome via the client device 100.

Note that although bets/wagers can be placed by remote device users on the outcome of an event any time before the betting competition has started. Once the betting competition has started, no new competition participants are allowed to enter the competition.

FIG. 2A is a block diagram illustrating another example of a network system 205 that includes a betting contest system 102 in accordance with some embodiments. As shown, the example network system 205 comprises a betting contest system 102, a network 104, a fantasy sports system 106, and client devices or digital data processing and remote communications devices 100-1 through 100-N(hereafter collectively referred to as clients 100).

For some embodiments, the network 104 may facilitate data communication between one or more of the betting contest system 102, the fantasy sports system 106, and the client devices 100. Accessibility to one or more of the betting contest system 102 and the fantasy sports system 106 by the client devices 100 may be implemented via the data network 104 (FIG. 2A).

Additionally, one or more of the betting contest system 102 or the fantasy sports system 106 may comprise one or more servers (see first and second servers FIG. 1B), which may be operating on or implemented using one or more cloud-based services (e.g., System-as-a-Service [SaaS]).

The betting contest system 102 may be configured to implement the functions and features of various embodiments described herein. For example, the betting contest system 102 may facilitate the establishment, and subsequent maintenance, of one or more betting contests where each betting contest involves a plurality of contest participants and a plurality of real-world sports players scheduled to play in a set of real-world sports matches (e.g., NASCAR, football, basketball, baseball, hockey, soccer, or golf,) over a time period.

The plurality of sports players may comprise sports players of any sports team or any position within a sports team or, alternatively, the plurality of sports players may comprise sports players of a particular sports team, of a specific team in a sports team (e.g., special teams), or playing a particular position on the sports team. The betting contest system 102 may form, for the betting contest, a wager pot comprising a plurality of wagers by the plurality of contest participants on a plurality of selected sports players that are selected from the plurality of sports players.

In some embodiments of the present invention the contestants must select teams and subsequently select players on or belonging to those teams. In other embodiments, the contestants may be enabled to select sports players for their fantasy team rosters independent of real-life team affiliation.

In further embodiments where contestants are enabled to select one or more sports players, one of the one or more sports players may be selected for a "captain" role (double points) within the fantasy sports team roster. For instance, contestants may be allowed to pick between three (3) to five (5) sports players and one (1) captain, to make for four (4) to six (6) sports player total selected by each contestant. In embodiments related to football, the captain must always be a quarterback. For embodiments related to other sports the position of the captain is not restricted.

It should be appreciated that any number of players may be selected for the standard player roles, and in addition, more than one captain may be allowed, per betting contest, or per betting contest round. Once a player has been selected as a captain by a contestant, that contestant may be prohibited from selecting that sports player again during the betting contest.

In embodiments that require selection of a team, the contestants are further prohibited from selecting the same team as the house. For embodiments that do not require selection of a team and contestants are allowed to build a fantasy sports team roster independent of real-life team affiliation of the players, the contestants may pick up to two of the same players as the house. In some embodiments.

In some further embodiments of the present invention, a fantasy sports team roster salary cap may be employed to ensure parity amongst lineups and to prevent contestants from simply choosing only the top players. The total salary cap applied may depend on the number of players required to be selected for the particular betting contest. The betting contest may set a salary cap to which the contestants must adhere in building their respective fantasy sports team rosters.

For example, if each contestant receives a salary cap of $50,000 and selects a first sports player costing $15,000 (as set by the betting competition platform), then $35,000 remains for the contestant to select additional sports players for the contestant's fantasy sports team roster. In preferred embodiments employing a salary cap, contestants are enabled to choose players from any team, independent of real-life team affiliation.

In additional embodiments of the present invention, the contestants may be prohibited from choosing the same team or the same players in subsequent rounds of a multi-round betting competition. In some of these embodiments, the contestants may be prohibited from choosing the same player lineup twice, meaning the contestants may be allowed to choose some specific number of same players on a fantasy sports team roster (e.g., no more than one or two players on a fantasy sports team roster may have been previously fielded by the contestant) or allowed to fill specific positions with prior fielded players (e.g., quarterback, kicker, pitcher, catcher).

In certain alternative embodiments, the betting competition house selection may also be likewise limited, disallowing selection of the same teams or players in subsequent rounds. House selections may be made automatically via computational algorithm or may be selected by humans.

Each wager in the plurality of wagers may correspond to one participant of the plurality of contest participants and correspond to one or more sports teams and sports players, in the plurality of selected sports player, selected by the one participant. The betting contest system 102 may receive, at or after expiration of the time period, a plurality of performance metrics relating to the plurality of selected sports players.

The betting contest system 102 may identify, from the plurality of contest participants, a (set of) contest winner(s) for the betting contest based on the total fantasy points accumulated by each contestant as accrued based on the performance metrics (e.g., touchdowns, yards carried, or yards passed by a football player) achieved by the player(s) selected by the contestant.

The betting contest system 102 may update the associated fantasy points and total fantasy score of each participant of the plurality of contest participants. The time period for the betting contest may comprise to a day, a week, a month, or a sports season.

For some embodiments, when the betting contest system 102 forms the wager for the betting contest, the betting contest system 102 may receive a selection of the one or more sports players from the first plurality of sports players from each given participant of the plurality of contest participants, thereby forming the plurality of selected sports players.

For each given participant of the plurality of contest participants, the betting contest system 102 may receive from the given participant an instruction for selection by a participant of one or more sports players in the plurality of selected sports players.

Before one or more betting contests begin, the betting contest system 102 may initialize each of associated contestant by charging a set fee (i.e., some set amount of money, points or credits) to each of the plurality of contest participants with a predetermined amount (e.g., initial balance), such that each contest participant in the betting contest starts with equal standing (i.e., each contestant in a single contest contributes the same amount to participate in the contest), before the betting contests and the associated plurality of sports matches commence.

By accessing the betting contest system 102, each contest participant effectively makes a wager of the entry fee on one or more selected sports players for the given betting contest.

Eventually, the betting contest system 102 receives for a given betting contest the set of performance metrics (e.g., from the fantasy sports system 106) associated with the plurality of selected sports players of the betting contest. Based on the set of performance metrics, the betting contest system 102 can determine a set of contest winners (i.e., one or more contest winners) for the given betting contest, where the set of contest winners selected the sports players having performed at least as well as the one or more sports players selected by the house, before the commencement of the betting contest.

Subsequently, the betting contest system 102 can update the account balances of the associated accounts of the plurality of contest participants according to the plurality of wagers, the wager pot, and the set of contest winners. During the update, credits, points or money winnings may be transferred from the wager pot to the respective associated account balances of contest winners, and the amounts transferred to each contest winner may depend on their ranking in the set of contest winners and which round of the contest each respective contestant survived through.

The fantasy sports system 106 may be configured to provide, with respect to a betting contest managed by the betting contest system 102, a set of actual performance results (e.g., performance metrics) for one or more real-world sports players that are participating in real-world sports matches associated with the betting contest. In particular embodiments, the fantasy sports system 106 provides the betting contest system 102 with the set of actual performance results for real-world sports players in the form of one or more fantasy sports scores for the real-world sports players.

The fantasy sports system 106 may provide the betting contest system 102 with the set of performance results for the sports players at or near real-time and may provide the set of performance results as a data stream of information. In certain embodiments, the fantasy sports system 106 provides a news feed that the betting contest system 102 can use to determine the set of performance results for the sports players.

For example, where the betting pool is associated with a plurality of sports matches (e.g., series of baseball games), the fantasy sports system 106 may provide betting contest system 102 with a sports news feed with a set of performance results for the sports players participating in those baseball sports matches. Depending on the embodiments, the set of performance results for the sports players can relate to player statistics or performance of the sports team on which the sports player is a member (e.g., team statistics).

One or more components of the fantasy sports system 106 may be implemented by one or more third-party services (e.g., news services) provided in commonly used data formats (e.g., RSS feeds, web services, JSON objects, etc.).

The clients devices or terminals 100 may be any form of computing device capable of receiving user input (e.g., configured to facilitate interaction between a betting pool participant and the betting contest system 102), capable of displaying a client user interface (e.g., configured to facilitate a betting pool participant to access the betting contest system 102), and capable of communicating with the betting contest system 102 over one or more of the communication connections over the network 104.

Such computing devices may include a mobile phone, a tablet computing device, a laptop, a desktop computer, personal digital assistant, a portable multi-media player, or any other type of network accessible user device known to those of skill in the art.

Each of the client devices 100 may be configured to communicatively connect with the betting contest system 102 and be provided with access to various functionalities provided by the betting contest system 102. For example, by way of one of the client devices 100, a user (e.g., as betting pool administrator) may establish a betting contest in association with a plurality of real-world sports players scheduled to participate in real-world sports matches, and a user may join a betting contest as a contest participant.

For some embodiments, a user joins the betting contest by paying an entry fee (e.g., buy in for the betting pool). Through one or more of the client devices 100, a contest participant may submit for one or more betting contests in a set of betting contests, one or more selected sports players and wagers on the selected players.

Figure 2B:
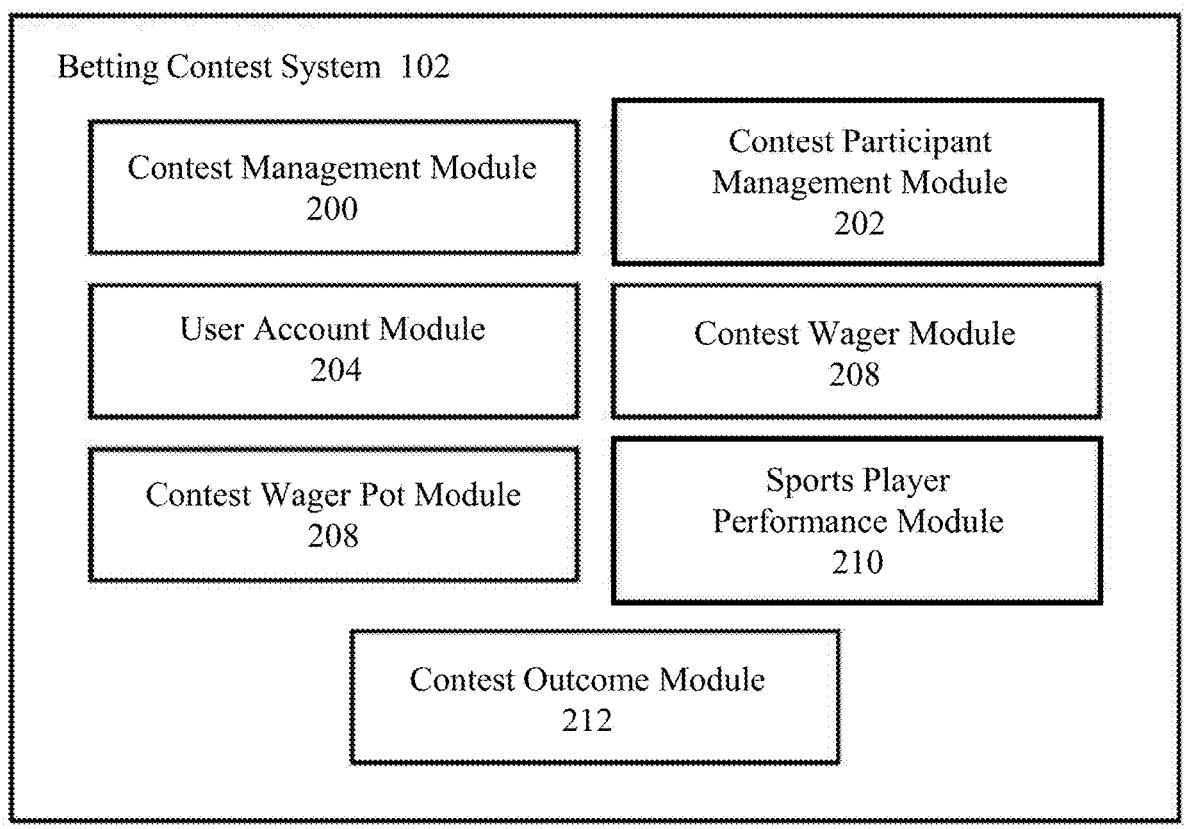
FIG. 2B illustrates an exemplary betting contest system comprising a contest management module, a contest participant management module, a user account module, a contest wager module, a contest wager pot module, a sports player performance module, and a contest outcomes module.

FIG. 2B is a block diagram illustrating an example betting contest system 102 in accordance with some embodiments. In FIG. 2B, the betting contest system 102 comprises a contest management module 200, a contest participant management module 202, a user account module 204, a contest wager module 206, a contest wager pot module 208, a sports player performance module 210, and a contest outcome module 212.

Those skilled in the art will appreciate that the composition of the betting contest system 102 may vary between different embodiments. For some embodiments, one or more of the components of the betting contest system 102, such as the contest management module 200, are implemented using the digital remote client device 100.

The contest management module 200 may be configured to establish, maintain, or manage one or more betting contests, where each betting contest involves a plurality of contest participants and a plurality of real-world sports players scheduled to play in a set of real-world sports matches (e.g., NASCAR, football, basketball, baseball, hockey, soccer, or golf) over a time period. The contest management module 200 may enable a contest administrator (e.g., accessing the betting contest system 102 via one of the client devices 100) to initiate the creation of a betting contest to be maintained by the betting contest system 102, and to enter the specific parameters of the betting contest.

Examples parameters that may be entered for a betting contest can include, without limitation, a name of the betting contest, a real-world sports or real-world sports league to be associated with the betting contest, parameters of selecting real-world sports players (e.g., sports players from only certain sports teams, or sports players playing a certain position on their respective sports team), a set of real-world sports matches in which the real-world sports players will be participating, a plurality of contest participants to be associated with the betting contest (i.e., which users can join the betting contest or set of betting contests), the time period (e.g., duration) for the betting contest, initial account balance for each contest participant, how one or more winners are selected at the end of the betting contest time period, wager settings (e.g., minimum entry fees, or wagers, required participation, etc.), settings relating to how contest participants can interact with the betting contest, and the like.

As noted herein, the set of real-world sports players that a contest administrator can select to associate with the betting contest may be predetermined by the betting contest system 102. The plurality of contest participants that the contest administrator associates with the betting contest may be permitted to join when they access the betting contest system 102 (e.g., via one of the client devices 100), and may further receive a message (e.g., via e-mail) from the betting contest system 102 to inviting them to join the betting contest.

For some embodiments, joining the betting contest involves collecting information from candidate contest participant, such as contact information, login information, user preferences, and like, before the candidate contest participant becomes an enrolled contest participant.

The contest participant management module 202 may be configured to facilitate management of contest participants with respect to a betting contest. Functions performed by the contest participant management module 202 may include processes relating to contest participants joining the betting contest, sending invitations to individuals to join the betting contest (e.g., based on the contest administrator's settings), and management of contest participant's preferences.

A contest participant's preferences may assist the betting contest system 102 in determining (e.g., auto-generating), for the contest participant, a sports player selection for a betting contest when, for example, the contest participant fails to submit their selection before the commencement of the betting contest. Likewise, the contest participant's preferences may assist the betting contest system 102 in determining (e.g., auto-generating), for the contest participant, a wager for the selected sports player for the betting contest when, for example, the contest participant fails to submit their selection before the commencement of the betting contest.

The contest participant's preferences may indicate a default sports player (e.g., always select Peyton Manning) to be selected by the betting contest system 102 for betting contests when the contest participant fails to provide one, and may indicate a default selection (e.g., teams and/or players) or wager (e.g., entry fee) when the contest participant otherwise fails to provide specific input.

The user account module 204 may be configured to manage a plurality of user accounts associated with contestants participating in a betting contest. In particular, the user account module 204 may maintain a user account balance (e.g., money, points, credits, etc.) in each user account associated with a contest participant and may credit or deduct amounts from the user accounts based on wagers, wager pots, and sets of contest winners determined for a betting contest.

Such credits and deductions of amounts may occur as the before the time period of a betting contest commences, or after the time period of a betting contest expires and a set of contest winners is determined. In accordance with some embodiments, where a given contest participant is involved more than one betting contest, a contest participant's user account may be unique for each betting contest in which the contest participant is involved.

With respect to a given betting contest, the user account module 204 is responsible for establishing, initializing, and associating a user contestant account with each contest participant that is associated with the given betting contest.

The contest wager module 206 may be configured to manage for a contest participant their selection of sports players and their wagers on selected sports players selected for betting contests. In particular, the contest account module 204 may collect and receive sports player selections, sports player selection changes, and wagers, i.e., entry fees, for a given betting contest, and may receive such submissions before the given real-world event begins.

When a contest participant submits a wager or entry fee for the given betting contest, the contest wager module 206 may limit such contestant from placing such wagers based on the current account balance associated with the contest participant, and may further limit such wagers based on the contest participant's total amount of wagers already committed to other betting contests.

The sports player performance module 210 may be configured to obtain or otherwise receive a set of performance results for participant selected sports players associated with a given betting contest. For some embodiments, the sports player performance module 210 obtains or receives the set of performance results for the selected sports players from two or more different information sources.

Examples of information sources can include, without limitation, news feeds, sports new feeds, blogs, organization websites, social media (e.g., Facebook® or Twitter®), and the like. The sports player performance module 210 may use different information sources for based on the type of sports, sports matches, or sports players associated with the betting contest.

The contest outcome module 212 may be configured to identify a set of contest winners (i.e., one or more contest winners) when a given betting contest has concluded. To do so, the contest outcome module 212 may access and review a set of performance results provided by the sports player performance module 210, and determine a set of contest participants winner based on the parameters of the betting contest (e.g., as defined through the contest management module 200).

For some embodiments, the contest outcome module 212 identifies (e.g., declares) a set of one or more contest participant winners of the betting contest who have beat the house. Alternatively, contest outcome module 212 may identify two or more contest participants as ranked winners (e.g., 1st, 2nd, and 3rd place winners). The contest outcome module 212 may further provide a ranking of contest participants at the conclusion of the betting contest, which may be utilized in distributing winnings from a wager pot of a given betting contest.

Figure 3:
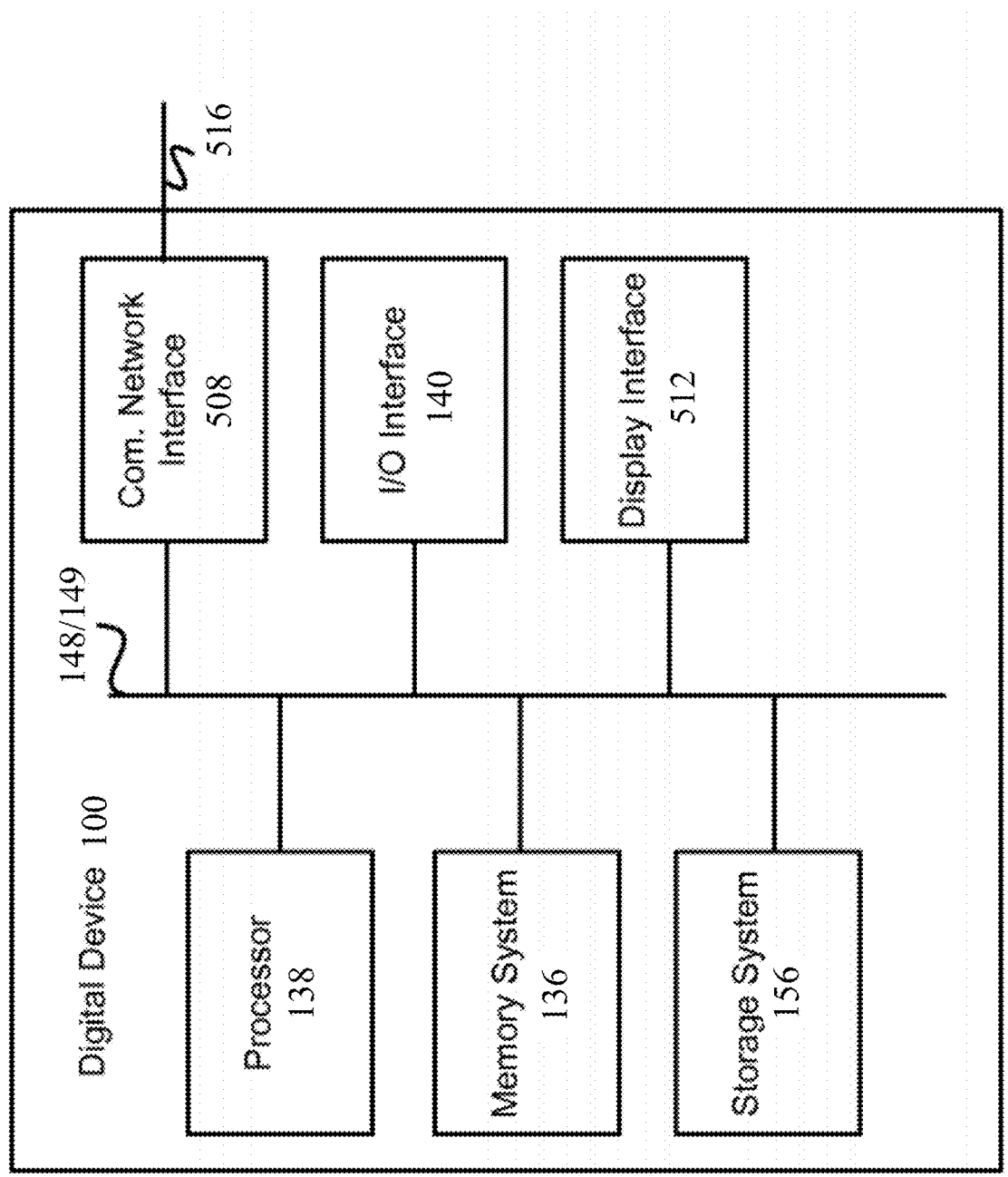
FIG. 3 illustrates another exemplary digital data processing and remote communications device, i.e., the client device, which may comprise a processor, a memory system, a storage system, a communication network interface, an I/O interface, and a display interface communicatively coupled to a bus.

FIG. 3 is a block diagram illustrating an example digital data processing and remote communications device 100 (the "client device") according to some embodiments. The client device 100 may comprise a processor 138, a memory system 136, a storage system 156, a communication network interface 508, an I/O interface 140 (i.e., for managing I/O circuits 146, and I/O Device drivers 158), and a display interface 512 communicatively coupled to a bus 148/149. The processor 138 may be configured to execute executable instructions (e.g., software application programs). In some embodiments, the processor 138 comprises circuitry or any processor capable of processing the executable instructions.

The memory system 136 is any memory configured to store data. Some examples of the memory system 136 are storage devices, such as RAM or ROM. The memory system may comprise the RAM cache. In various embodiments, data is stored within the memory system 136. The data within the memory system may be cleared or ultimately transferred to the storage system 156.

The storage system 156 is any storage configured to retrieve and store data. Some examples of the storage system 156 are flash drives, hard drives, optical drives, or magnetic tape. In some embodiments, the client device 100 includes a memory system 136 in the form of RAM and a storage system 156 in the form of flash data. Both the memory system 136 and the storage system 156 comprise computer readable media that may store instructions or programs that are executable by a computer processor including the processor 138.

The communication network interface (com. network interface) 508 may be coupled to a data network 104 via the link 516. The communication network interface 508 may support communication over an Ethernet connection, a serial connection, a parallel connection, or an ATA connection, for example. The communication network interface 508 may also support wireless communication (e.g., 802.11 a/b/g/n, WiMAX). It will be apparent to those skilled in the art that the communication network interface 508 may support many wired and wireless standards.

The optional input/output (I/O) interface 140 is any device that receives input from the user and output data. The optional display interface 512 is any device that may be configured to output graphics and data to a display. In one example, the display interface 512 is a graphics adapter.

It will be appreciated by those skilled in the art that the hardware elements of the client device 100. The client device 100 may comprise more or less hardware elements than those depicted. Further, hardware elements may share functionality and still be within various embodiments described herein. In one example, encoding or decoding may be performed by the processor 138 or a co-processor located on a GPU.

One or more functions may be stored on a storage medium such as a computer readable medium. The instructions can be retrieved and executed by a processor. Some examples of instructions are software, program code, and firmware. Some examples of storage medium are memory devices, tape, disks, integrated circuits, and servers. The instructions are operational when executed by the processor to direct the processor to operate in accord with some embodiments. Those skilled in the art are familiar with instructions, processor(s), and storage medium.

In another embodiment, such instructions can be configured for electronically placing the at least one bet with respect to the at least one event during the round of betting via a wireless or remote terminal or digital data processing and remote communications device (i.e., the client device 100) and a wireless or remote communications network.

Additionally, as indicated herein, the client device 100 can be, for example, a Smartphone (e.g., iPhone, Android Phone, Blackberry), another hand held device such as, for example, a PDA (Personal Digital Assistant), a tablet computing device (e.g., iPad, etc.), a personal computer such as a desktop computer, a laptop computer, etc.

Figure 4:
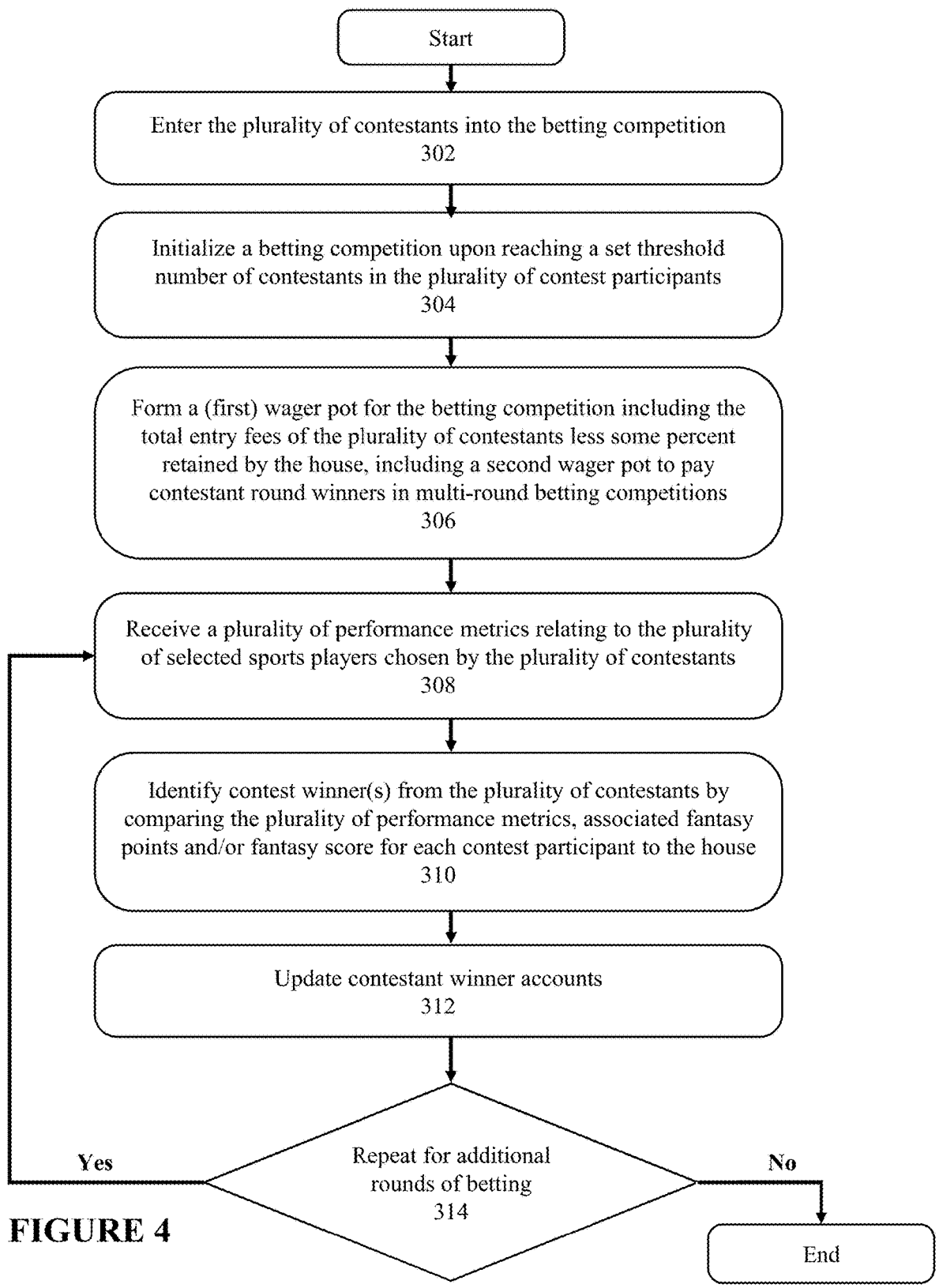
FIG. 4 illustrates a flow diagram of an an exemplary betting contest method.

FIG. 4 is a flow diagram illustrating an exemplary betting contest method 300 in accordance with some embodiments. The method 300 begins at step 302 with the user account module 204 initializing participation of and entering each participant of a plurality of contest participants of the betting contest by paying the entry fee, or any charge required to enter the contest.

For some embodiments, a betting contest is associated with a plurality of contest participants, and each contest participant in the plurality of contest participants is associated with a user account. Depending on the embodiment, the money, points or credits associated with a given contest participant may be maintained in a user account associated with the given contest participant.

At step 304, the contest management module 200 may establish a set of betting contests in association with the plurality of contest participants, where each betting contest may be associated with a plurality of sports players scheduled to play in a set of sports matches over a time period. At step 306, the contest wager pot module 208 may form a wager pot for (e.g., in association with) a given betting contest in the set of betting contests (e.g., for at least one of the betting contests in the set).

For some embodiments, one or more separate wager pots are formed (e.g., established) for each betting contest in a set of betting contests. A given wager pot may be formed before the commencement of the betting contest to which it is associated. Once formed, the contest wager pot may include a plurality of wagers, by the plurality of contest participants, on a plurality of selected sports players in the plurality of sports players.

At step 308, for the given betting contest, the sports player performance module 210 may receive (or otherwise obtain) a plurality of performance metrics relating to the plurality of selected sports players associated with the given betting contest. Depending on the embodiment, the plurality of performance metrics may be received in one or more separate data transfers, and each data transfer may include the performance metrics of sports players not included in the plurality of selected sports players.

For some embodiments, the plurality of performance metrics is received in the form of fantasy points associated with a sports player, and such fantasy sports may be received (or otherwise obtained) from more than one fantasy sports source or system (e.g., Yahoo®, ESPN®, NFL.com, etc.).

At step 310, for the given betting contest, the contest outcome module 212 may identify from the plurality of contest participants a set of contest winners based on the plurality of performance metrics received (or obtained) at step 308. At step 312, for the given betting contest, the user account module 204 may update the account balance (i.e., the money, points or credits) associated with each contest participant of the plurality of contest participants based on the set of contest winners, based on the plurality of wagers, and based on the wager pot.

For example, based on the contest outcome module 212 may determine the contestant winners that have beaten the house, or, e.g., the top three contest winners (e.g., 1st, 2nd and 3rd place winners), based on the performance metrics of their respective selected sports players. For unraked classes of winners, the contest winners may all receive an equal portion of the wager pot. For ranked classes of winners, the top three contest players may collect winnings from the wager pot according to their respective rankings. In particular, the first place winner may collect from the wager pot a maximum amount, the second place winner a second most amount, and the third place winner a third most amount, with all other winners that have beat the house receiving an equal share of a remaining pot.

Importantly, in a preferred embodiment of the present invention, if all contestants in a betting contest lose to the house, the house pays all contestants of the final round an equal share of one or more of the first and second pots.

At step 314, if there are additional rounds in the betting contest, some or all of the steps 306-312 may be performed with respect to each of those additional betting contest rounds. It will be understood that for some embodiments, the steps of method 300 may be performed in parallel with respect to different betting rounds, such as when a first round is established and a second round may be established before the first round has ended.

Though the steps of the method 300 may be depicted and described in a certain order, those skilled in the art will appreciate that the order in which the steps are performed may vary between different embodiments. Additionally, those skilled in the art will appreciate that the components described above with respect to the method 300 are merely examples of components that may be used with the method 300, and that other components may also be utilized in some embodiments.

The mobile application described herein provides users a unique way to wager on their favorite sports day after day, week after week until the end of each contest. When one or more user or contest participants survive the entirety of a contest, they shall receive the wager pot (i.e., the money, point or credits winnings). The wager pot comprises the total amount of all entry fees, the sum of money, points or credits that equals the total number of entrants multiplied by the entry fee less 25% retained by the house.

Users can view their profiles, current funds available and add more funds functionality, past contests, personal scores, winnings and other stats, as compared to competitors on a leaderboard or as compared house stats, competitors' scores and winnings.

Users that survive a given round move on to the next round, until they are eliminated or become a winner. In certain preferred embodiments of the present invention, users may only use a team and its players once in each contest. Teams already used will be either greyed out or crossed out. The process then repeats until there is a winner. In preferred embodiments of the present invention ties with the house will lose. In some embodiments, ties with the house may win.

Figure 5A:
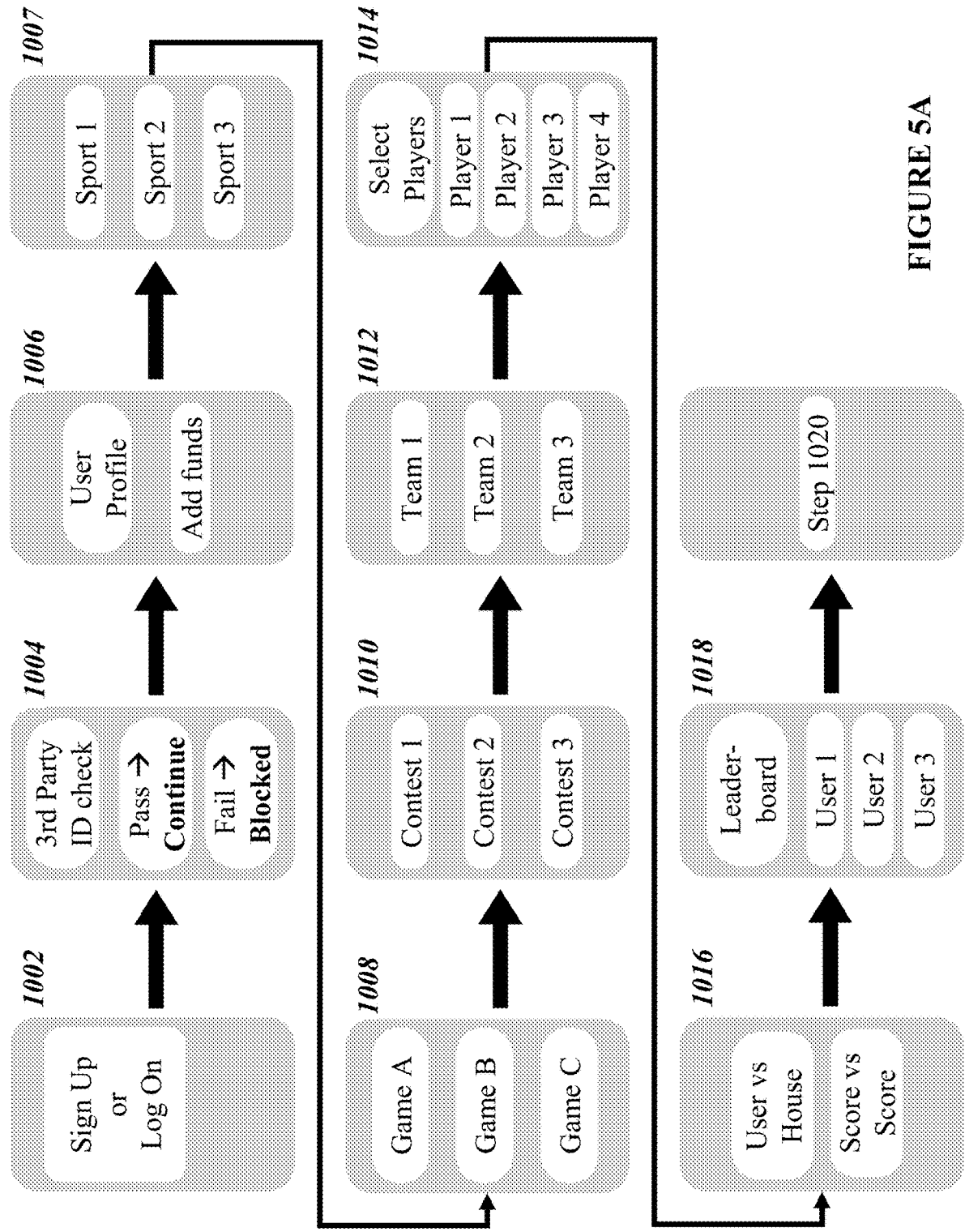
FIG. 5A illustrates a process flow diagram for a method enabling a user to sign up and log on to the betting competition platform, add funds, select contests and place and track bets.

FIG. 5A depicts the process flow of a method for enabling a user to sign up and log on to the betting competition platform, add funds, select contests and place and track bets.

Specifically, step 1002 illustrates user signup or login into the betting competition platform.

Step 1004 illustrates user identity verification, e.g., by a third-party service provider. Upon successful registration or login and passing a 3rd party ID check, the user or contest participant is enabled to edit their user profile and update their account balance.

Step 1006 illustrates access to the user profile, and the ability to add more funds to a user or contest participant account.

Figure 15:
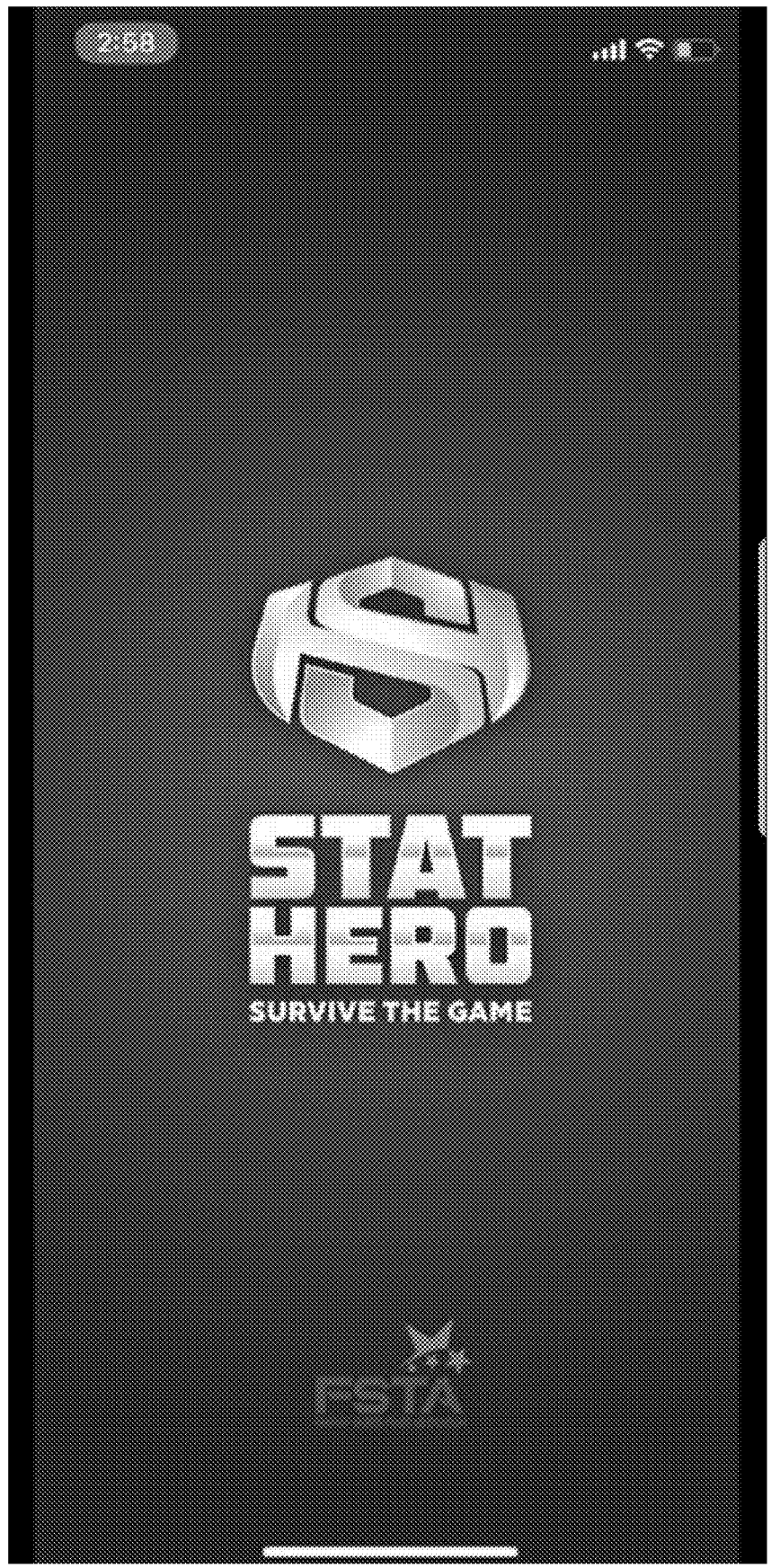
FIG. 15 illustrates an exemplary betting competition platform splash screen.

Step 1007 illustrates user access to the StatHero navigation screen (e.g., a home screen from which the user may select type of contest to enter (e.g., based on which sports or betting contests are of interest to them—FIGS. 14-15).

Step 1008 illustrates a screen enabling a user to choose from several different game types, each with its own rules (e.g., potential games may be centered on the National League conference of the MLB, or possibly the AFC teams in the NFL). Yet further options include half-season contests, weekly and monthly contests, and even daily contests for sports or competitions with appropriate event schedules. The mobile application will accommodate a variety of user tastes and preferences for contest structures. Once users select the type of game they want to play, they get to choose the contests.

Step 1010 illustrates a screen enabling a user to select specific betting contests, which are typically set apart by the number of entrants allowed to enter and entry fees (i.e., the contestant wager).

Step 1012 illustrates a screen enabling a user to select the specific team they think has the best players that will score the most fantasy points, as compared to the team and player selections posted by the house.

Step 1014 illustrates a screen enabling a user to select three or more players from the same team they have just selected.

Step 1016 illustrates a screen enabling a user to view their player fantasy scores and their fantasy score totals, in real-time versus the house selections.

Step 1018 illustrates a screen providing an alternate view for users to track where everyone stands in a given betting contest.

Figure 5B:
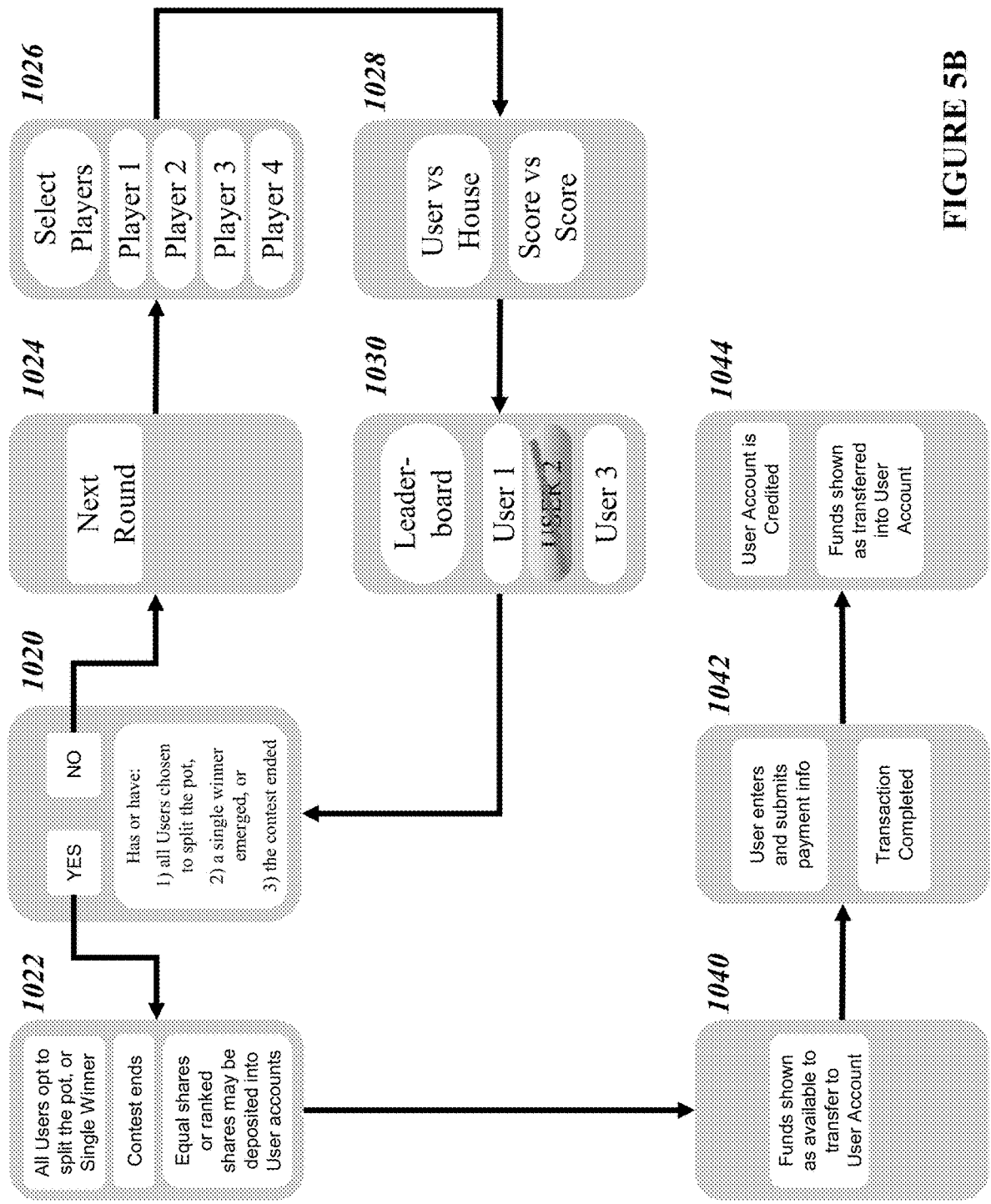
FIG. 5B illustrates a continuation of the process flow diagram of FIG. 5A, providing an option to "split the pot" when the number of remaining contestants has fallen below a set threshold.

As shown in FIG. 5B, step 1020 illustrates a screen providing "split the pot" scenario, where the system or methods evaluate whether the remaining number of contest participants has fallen below some threshold, e.g., less than fifty percent (50%), less than ten percent (10%), etc. If the number of contest participants remaining in a given betting contest has fallen below the set threshold, the system or methods evaluate whether a single winner has emerged. If a single winner has emerged, the winner is declared, the contest is ended and the winner's account balance is updated accordingly.

If the remaining number of contest participants is below the threshold, but a single winner has not emerged, the remaining contest participants, those still standing and participating in the contest, receive a prompt (e.g., an auto alert in app, in an email, text or other appropriate mode of communication) to provide those remaining contestants with the option to split the pot, thereby ending the contest early and dividing the contest winnings accordingly (e.g., equally among all contestants or according to ranking or total fantasy point score of the contestants, etc.), in step 1022.

In step 1020, where the remaining number of contestants has fallen below the threshold level, each contest participant makes their respective selection of whether to participate in a "split the pot" scenario or to remain in the contest. The group decision of whether to split the pot may be made by consensus, super-majority, or majority.

If the number of contest participants remaining in the contest is greater than the set threshold at step 1020, the system evaluates whether the contest has ended. If a contest proceeds to conclusion, without an affirmative decision by the contest participants to split the pot, and before a single winner emerges, then the remaining participants are declared winners of the betting contest.

The participants may be ranked by place (e.g., first, second, third, etc.) based upon the total number of fantasy points accrued by all of the sports players selected by each of the respective contestants, with amount of payment to winning contestant account balances depending upon their respective rankings. Alternatively, all remaining contestants may receive an equal share of the winnings.

As depicted in FIG. 5B, at step 1020, if the contest has not ended and no single winner has emerged, the contest proceeds to the next round of competition betting, in step 1024, leading through steps 1026-1030, correlating respectively to steps 1014-1018 (FIG. 5A).

Steps 1024-1030 illustrate that the contest continues to the next round, unless all remains users agree to spit the pot, a single winner emerges, or multiple winners are left at the end of a contest. After falling below the remaining-users threshold, the process repeats each round with the possibility to split the pot, until the contest concludes.

Steps 1022-1044 illustrate what happens when all users agree to split the pot, a winner emerges, or there are multiple winners left at the end of a contest. The contest has ended, and accounts are credited with the winnings split evenly among those remaining.

Step 1040: Illustrates a screen showing funds as available to transfer to the account balance of a contest participant, upon winning.

Step 1042: Illustrates a screen enabling a user to enter payment details, and processing of the funds transfer or payment transaction to the contest participant account.

Step 1044: Illustrates a screen indicating funds credited and transferred into the contestant's account.

Figure 6:
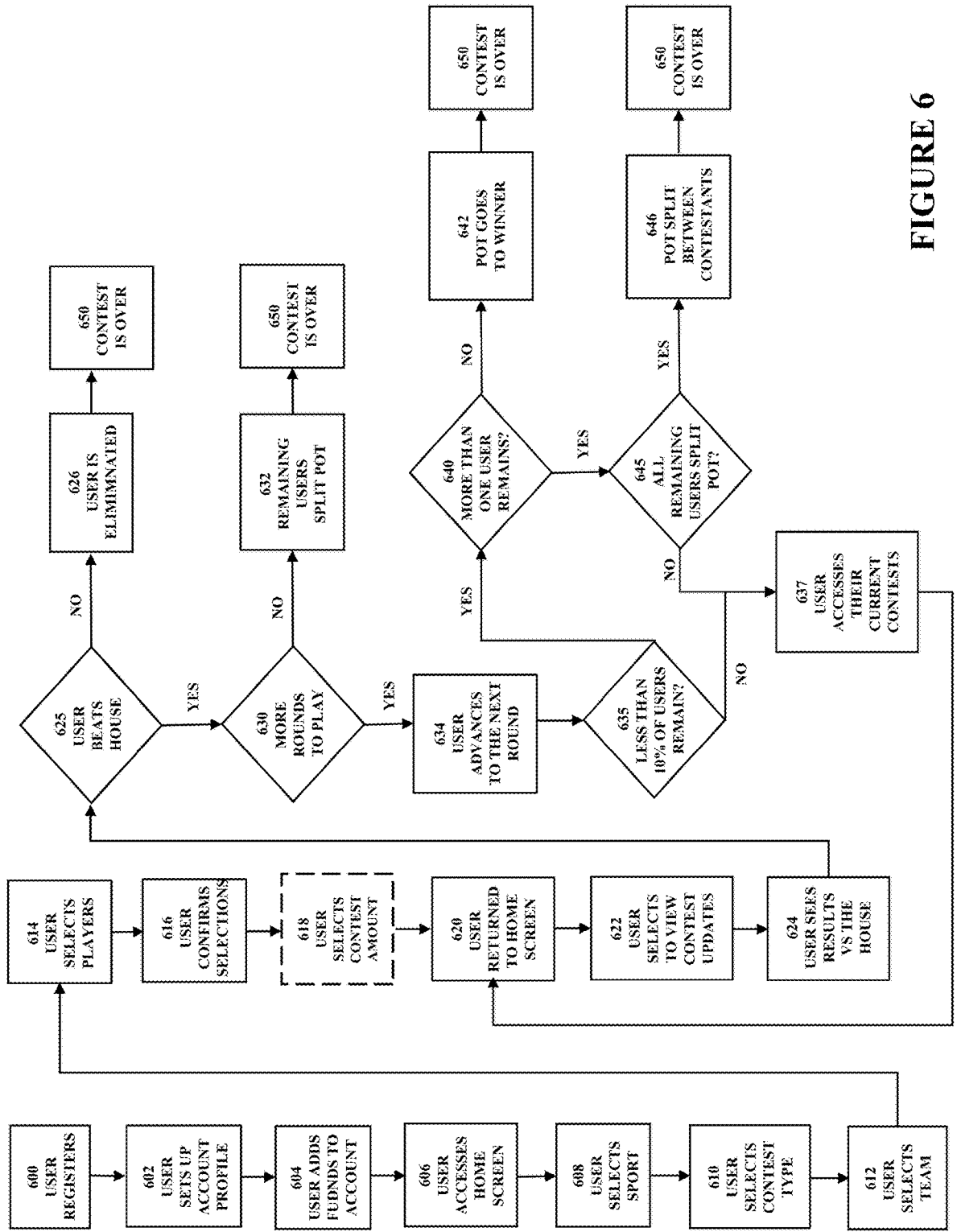
FIG. 6 illustrates an exemplary process flow diagram for a method enabling user registration, logon, profile management, contest selection, and placing and tracking of bets in a betting contest.

FIG. 6 illustrates an exemplary process flow diagram for a method enabling user registration, logon, profile management including updating account balance, contest selection, placing and tracking bets throughout the duration of the betting contest. As depicted in FIG. 6, at step 600, the system or methods provide for user registration. In step 602, the user sets up their account profile, including payment information.

In step 604, the user is enabled to add funds to their account balance. At step 606, the user accesses the betting competition platform navigation page (e.g., home page), where the user is enabled to select a sport, in step 608. In step 610, the user selects the type of contest (see FIGS. 5-9).

In step 612, the user may be enabled to select one or more specific sports teams (for embodiments that are not based purely on sports players, but also include a team selection).

In step 614, the user may be enabled to select one or more players. In embodiments including team selection, the user or contestant will be limited to select players associated with the specific team(s) selected. In step 616, the user may be prompted to confirm player selections. In step 618, the user may further be enabled to select amount of the wager. In steps 620-624, the user is respectively returned to the navigation page (e.g., home page) (step 620), enabled to select to view contest status updates (step 622), and also enabled to view status or results of the betting contest between the contestant and the house or between the contestant and other contestants.

In step 625, the systems or methods of the present invention evaluate whether a user or contestant has beat the house. If the user has not beat the house, the contestant is eliminated from play in the betting contest (step 626) and the contest is concluded for that contestant/user (step 650). If the contestant/user successfully beats the house in step 625, then the systems or methods of the present invention evaluate, in step 630, whether there are more rounds to play in the betting contest. If no rounds of play remain, the remaining users split the pot, or in the case of a single winner, the contestant wins the entire wager pot, step 632, and the contest is concluded in step 650.

In step 630, if the system or methods of the present invention determine that additional rounds of play remain in the present betting contest, contestants/users advance to the next round of play in step 634. In step 635, the system or methods of the present invention evaluate whether the remaining number of contest participants has fallen below some set threshold value (e.g., less than fifty percent (50%), less than ten percent (10%), etc.). If the threshold is met, the systems and methods of the present invention next determine whether more than one contestant remains in step 540.

If only one contestant remains, the wager pot is transferred to the winning contestant (step 642) and the contest is concluded in step 650. If more than one contestant remains in the betting contest, the process continues to step 645, where all remaining contest participants are prompted with the option to split the pot or continue in the betting contest.

If all (consensus) or some portion (supermajority or majority) of the remaining contestants choose to split the pot, the wager pot will be split amongst the remaining contestants (step 646) and the contest is concluded (step 650). In such cases, the wager pot may be split equally among the winning contestants or may be shared (i.e., amounts paid out) according to rank or place of the respective contestants.

In step 645, if the threshold of contestants required to result in a "split the pot" scenario is not met, then the contestants/users are enabled to return to their current contests (step 637), and re-enters the process in Sep 620, at the navigation screen (e.g., home page), where the user/contestant may select specific contests to view status updates (step 622). This process continues until the contest concludes, a single winner emerges, or the threshold number of contestants is met to result in a "split the pot" scenario.

Figure 7:
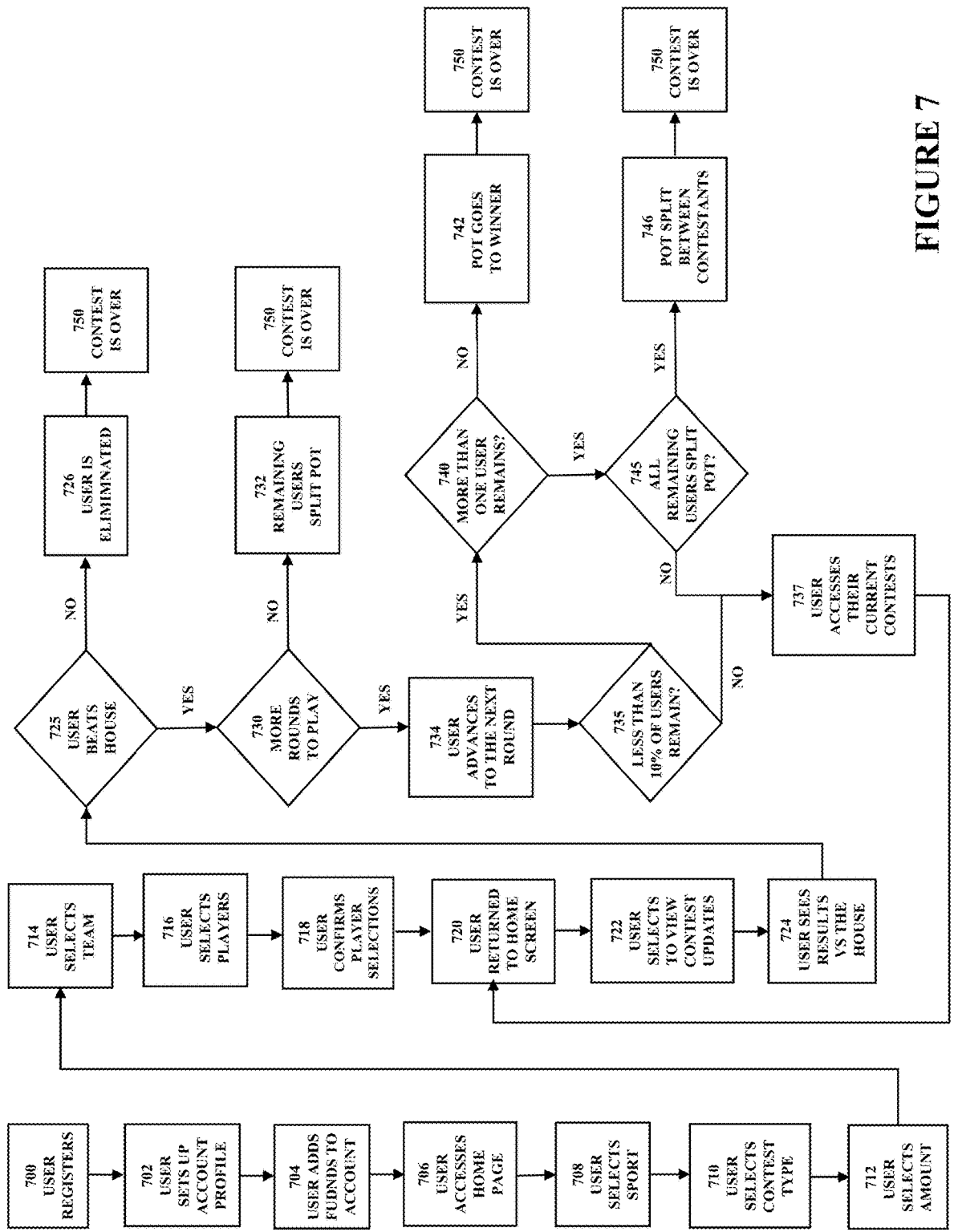
FIG. 7 illustrates a second exemplary process flow diagram for a method enabling user registration, logon, profile management, contest selection, and placing and tracking of bets in a betting contest.

FIG. 7 illustrates another exemplary process flow diagram for a method enabling user registration, logon, profile management, contest selection, and placing and tracking of bets in a betting contest. As depicted in FIG. 7, at step 700, the system or methods provide for user registration. In step 702, the user sets up their account profile, including payment information. In step 704, the user is enabled to add funds to their account balance. At step 706, the user accesses the betting competition platform navigation page (e.g., home page), where the user is enabled to select a sport, in step 708. In step 710, the user selects the type of contest (see FIGS. 5-9).

In step 712, the user may be enabled to select an amount to wager. In step 714, the user may be enabled to select one or more specific sports teams (for embodiments that are not based purely on sports players, but also include a team selection). In step 716, the user may be enabled to select one or more players. In embodiments including team selection, the user or contestant will be limited to select players associated with the specific team(s) selected.

In step 718, the user may be prompted to confirm player selections. In steps 720-724, the user is respectively returned to the navigation page (e.g., home page) (step 720), enabled to select to view contest status updates (step 722), and also enabled to view status or results of the betting contest between the contestant and the house or between the contestant and other contestants.

In step 725, the systems or methods of the present invention evaluate whether a user or contestant has beat the house. If the user has not beat the house, the contestant is eliminated from play in the betting contest (step 726) and the contest is concluded for that contestant/user (step 750). If the contestant/user successfully beats the house in step 725, then the systems or methods of the present invention evaluate, in step 730, whether there are more rounds to play in the betting contest. If no rounds of play remain, the remaining users split the pot, or in the case of a single winner, the contestant wins the entire wager pot, step 732, and the contest is concluded in step 750.

In step 730, if the system or methods of the present invention determine that additional rounds of play remain in the present betting contest, contestants/users advance to the next round of play in step 734. In step 735, the system or methods of the present invention evaluate whether the remaining number of contest participants has fallen below some set threshold value (e.g., less than fifty percent (50%), less than ten percent (10%), etc.). If the threshold is met, the systems and methods of the present invention next determine whether more than one contestant remains in step 740.

If only one contestant remains, the wager pot is transferred to the winning contestant (step 742) and the contest is concluded in step 750. If more than one contestant remains in the betting contest, the process continues to step 745, where all remaining contest participants are prompted with the option to split the pot or continue in the betting contest.

If all (consensus) or some portion (supermajority or majority) of the remaining contestants choose to split the pot, the wager pot will be split amongst the remaining contestants (step 746) and the contest is concluded (step 750). In such cases, the wager pot may be split equally among the winning contestants or may be shared (i.e., amounts paid out) according to rank or place of the respective contestants.

In step 745, if the threshold of contestants required to result in a "split the pot" scenario is not met, then the contestants/users are enabled to return to their current contests (step 737), and re-enters the process in Sep 720, at the navigation screen (e.g., home page), where the user/contestant may select specific contests to view status updates (step 722). This process continues until the contest concludes, a single winner emerges, or the threshold number of contestants is met to result in a "split the pot" scenario.

Figure 8:
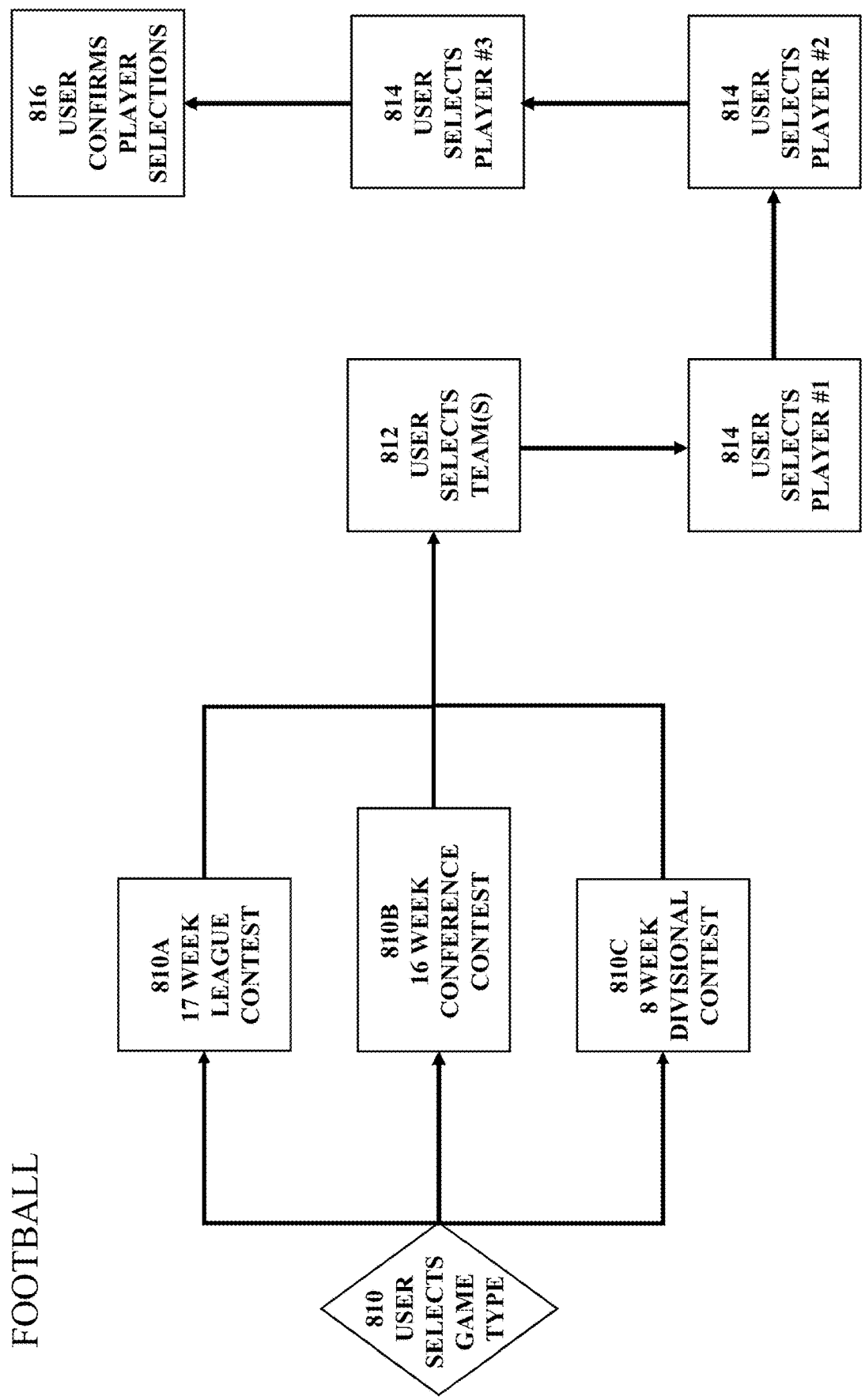
FIG. 8 illustrates an exemplary submodule implementing contestant selection of contest types for football.
Figure 9:
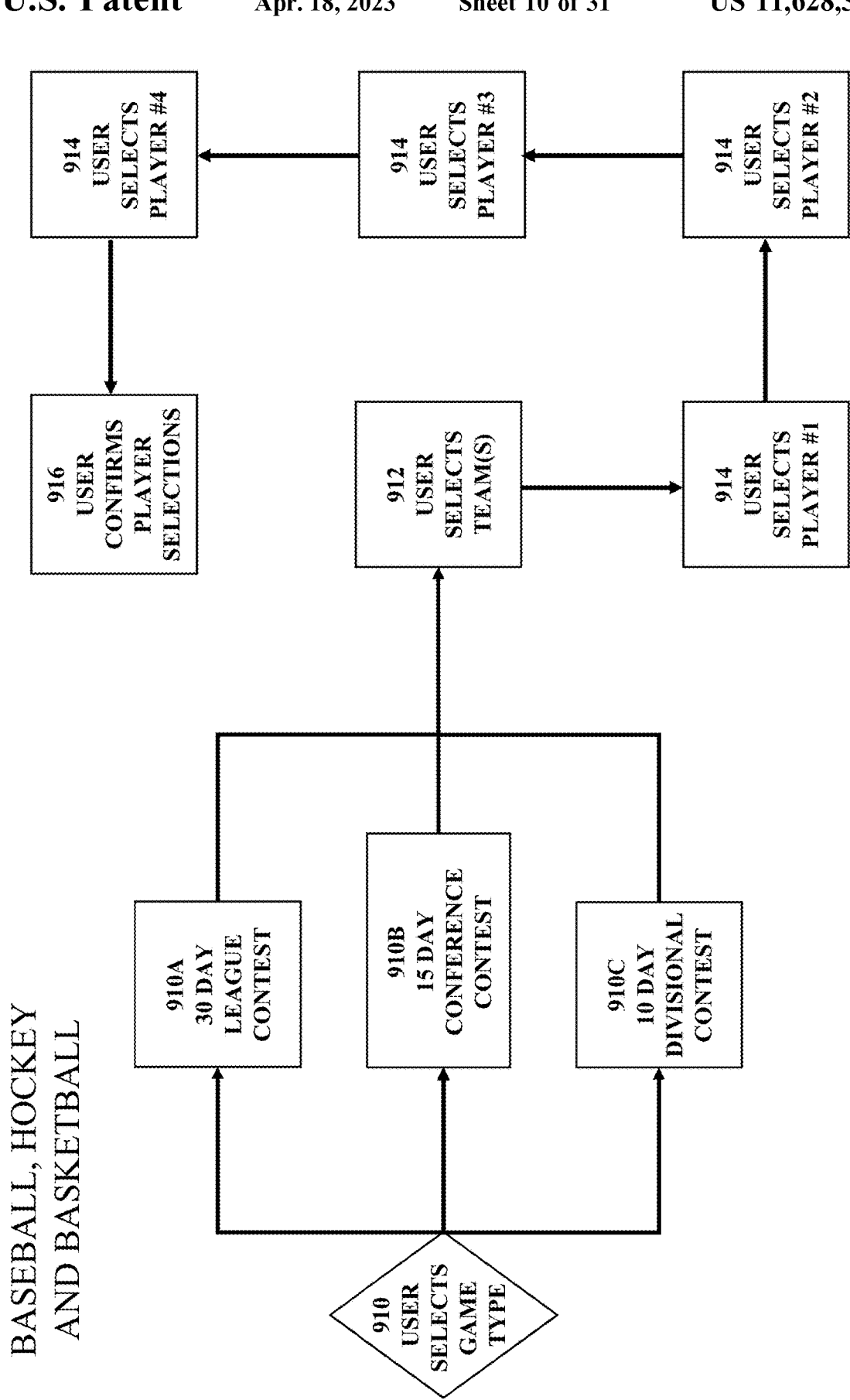
FIG. 9 illustrates an exemplary submodule implementing contestant selection of contest types for baseball, hockey and basketball.
Figure 10:
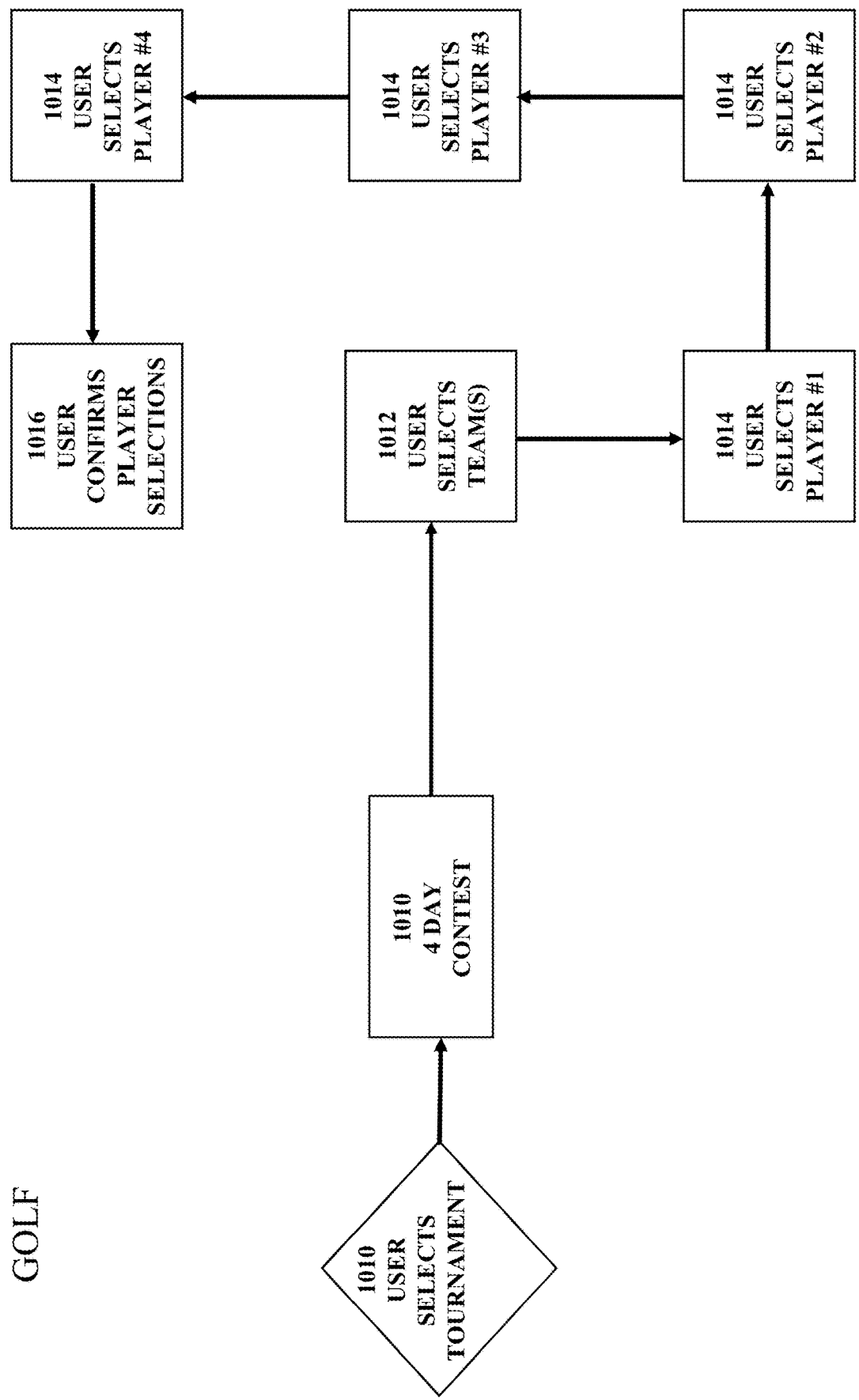
FIG. 10 illustrates an exemplary submodule implementing contestant selection of contest types for golf.

FIGS. 8-10 depict examples of submodules implementing contest types for football, baseball, hockey and basketball, and golf, respectively. FIG. 8 depicts examples of the different types of contests that may be selected for football in steps 610 and 710, of FIGS. 6 and 7 respectively. FIG. 9 depicts examples of the different types of contests that may be selected for baseball, hockey and basketball in steps 610 and 710, of FIGS. 6 and 7 respectively. FIG. 10 depicts an example contest type that may be selected for golf in steps 610 and 710, of FIGS. 6 and 7 respectively.

In each of these examples, contestants may select one or more sports players. In certain embodiments, the sports players may be required to be selected from a single team. In certain other embodiments, the sports players chosen may be selected from two or more sports teams. In certain further embodiments, the sports players chosen may be selected from a primary sports team with a single player selected as a 'wild card' from a second sports team or from an arbitrary list of sports players permissible to select as a wild card (e.g., kickers).

FIG. 8 depicts step 810, user choosing the game type, and steps 810A, 810B, and 810C representing various exemplary contest or game types. In step 812, the user may select one or more teams, and in step 814 the contestant selects one or more players. In step 816, the contestant confirms their sports players selections.

FIG. 9 depicts step 910, user choosing the game type, and steps 910A, 910B, and 910C representing various exemplary contest or game types. In step 912, the user may select one or more teams and in step 914 the contestant may select one or more players. In step 916, the contestant confirms their sports players selections.

FIG. 10 directed to golf, depicts step 1010 where the user chooses a specific golf tournament and is enabled to play a 4-day contest. In step 1012, the contestant may select one or more teams and in step 1014 the contestant may select one or more players. In step 1016, the contestant confirms their sports players selections.

For instance, with golf, betting contests may be based on the PGA tournaments, with each day of a tournament comprising a round in the betting competition. For each day, the house may pick five golfers and the contestants may pick five golfers. In subsequent rounds, only two golfers may be the same as the contestant's prior selections, and the same rule applies to the house.

FIG. 11 depicts a table portraying the payout structure for an exemplary betting competition based on a baseball fantasy sports format.

FIG. 12 depicts a table portraying the payout structure for an exemplary betting competition based on a basketball fantasy sports format.

FIG. 13 depicts a table portraying the payout structure for an exemplary betting competition based on a golf fantasy sports format.

FIG. 14 depicts a table portraying the payout structure for an exemplary betting competition based on a based on a baseball fantasy sports format. In these figures, the contestants are referred to as players.

As a further example, consider 50 entrants in a contest with a fifty-dollar ($50.00) entry fee would net a total available pool in the wager pot of one thousand eight hundred seventy-five dollars (USD $1,875.00). To demonstrate, 50×$50.00=$2,500.00. 25%=0.25. 0.25×$2,500.00=$625.00. $2,500.00-$625.00=$1,875.00.

In addition to a unique pot splitting structure, the present invention also comprises a unique payout scheme, whereby the surviving contestants of any given betting competition or betting round receive some minimum payout, irrespective of whether the users elect to participate in an early termination of the competition and a multi-way split payout.

For example, assuming a first exemplary competition includes 100 users, each paying a $100 competition entry fee. That totals $10,000.00. Say the house takes $2,500.00 for operating the competition. We have a total pot of $7,500.00 that can be paid out to the users in any number of various ways.

In one embodiment of the present invention, the $7,500.00 total pot of this first exemplary competition may be split in half for a "prize pot" of $3,750.00, to be paid out to one or more winners, and a "multi-round payout pot" of $3,750.00 to be paid out to every user surviving some arbitrary round, such as the first round, second round or third round, etc., and potentially including additional payout in one or more subsequent rounds.

In a preferred embodiment of the present invention, the pro-rata value of the multi-round payout pot is set at the start of the first round of this first exemplary competition. $3,750.00 of the multi-round payout pot, divided by 100 users in the competition, equals $37.50 ($3,750.00/100=$37.50) per user.

Then, say that 30 users are eliminated at the completion of the first round of this first exemplary competition. According to the novel payout scheme of the present invention, 30 times $37.50 equals $1,125.00 (30×$37.50=$1,125.00) for the round payout pot that is paid out to the first round 'winners' or surviving users. With 70 users beating the house, the round payout is $1,125.00 divided by 70, and equals $16.07 ($1,125.00/70=$16.07) per user.

Then, let's say that in this first exemplary competition, after the second round 50 users are eliminated, leaving only 20 users remaining. The same math would apply, with 50 times $37.50 equal to $1,875.00 (50×$37.50=$1,875.00) for the round payout pot. Dividing by 20, we get $93.75 per surviving user. This can continue until the multi-round payout pot is exhausted or the competition concludes with one or more winners splitting the remainder of the multi-round payout pot as well as the prize pot.

As another example of the novel payout scheme of the present invention, let's say in this second exemplary competition that we have 1,000 users who have paid a $100.00 competition entry fee. That totals $100,000.00. Say the house takes $25,000.00 for operating the competition. We have a total pot of $75,000.00 that can be paid out to the users in any number of various ways.

In one embodiment of the present invention, the $75,000.00 total pot of this second exemplary competition may be split in half for a "prize pot" of $37,500.00, to be paid out to one or more winners, and a "multi-round payout pot" of $37,500.00 to be paid out to every user surviving some arbitrary round, such as the first round, second round or third round, etc., and potentially including additional payout in one or more subsequent rounds.

In a preferred embodiment of the present invention, the pro-rata value of the multi-round payout pot is set at the start of the first round of this second exemplary competition. $37,500.00 of the multi-round payout pot, divided by 1,000 users in the competition, equals $37.50 ($37,500.00/1000=$37.50) per user.

Then, say that 900 users are eliminated at the completion of the first round of this second exemplary competition. According to the novel payout scheme of the present invention, 900 times $37.50 equals $33,750.00 (900×$37.50=$33,750.00) for the round payout pot that is paid out to the first round 'winners' or surviving users. With only 10 users beating the house, the round payout is $33,750.00 divided by 100, and equals $337.50 ($33,750.00/100=$337.50) per user.

Then, let's say that in this second exemplary competition, after the second round 5 users are eliminated, leaving only 5 users remaining. The same math would apply, with 5 times $37.50 equal to $187.50 (5×$37.50=$187.50) for the round payout pot. Dividing by 5, we get $37.50 ($187.50/5=$37.50) per surviving user. This can continue until the multi-round payout pot is exhausted or the competition concludes with one or more winners splitting the remainder of the multi-round payout pot as well as the prize pot.

Using the same starting numbers for a third exemplary competition, let's say that 200 users are eliminated at the completion of the first round of this third exemplary competition. According to the novel payout scheme of the present invention, 200 times $37.50 equals $7,500.00 (200×$37.50=$7,500.00) for the round payout pot that is paid out to the first round 'winners' or surviving users. With 800 users beating the house, the round payout is $7,500.00 divided by 800, and equals $9.375 ($7,500.00/800=~$9.38) per user.

Then, let's say that in this third exemplary competition, after the second round 750 users are eliminated, leaving only 50 users remaining. The same math would apply, with 750 times $37.50 equal to $28,125.00 (750×$37.50=$28,125.00) for the round payout pot. Dividing by 50, we get $562.50 ($28,125.00/50=$562.50) per surviving user.

Then, let's say that after a third round of this third exemplary competition, 35 users are eliminated, leaving only 15 users remaining. The same math would apply, with 35 times $37.50 equal to $1,312.50 (35×$37.50=$1,312.50) for the round payout pot. Dividing by 15, we get $87.50 ($1,312.50/15=$87.50) per surviving user.

This can continue until the multi-round payout pot is exhausted or the competition concludes with one or more winners splitting the remainder of the multi-round payout pot as well as the prize pot.

FIG. 15 illustrates an exemplary betting competition platform splash screen for the present invention. From the splash screen the user may be directed to one or more of a home screen or various navigation screens.

Figure 16:
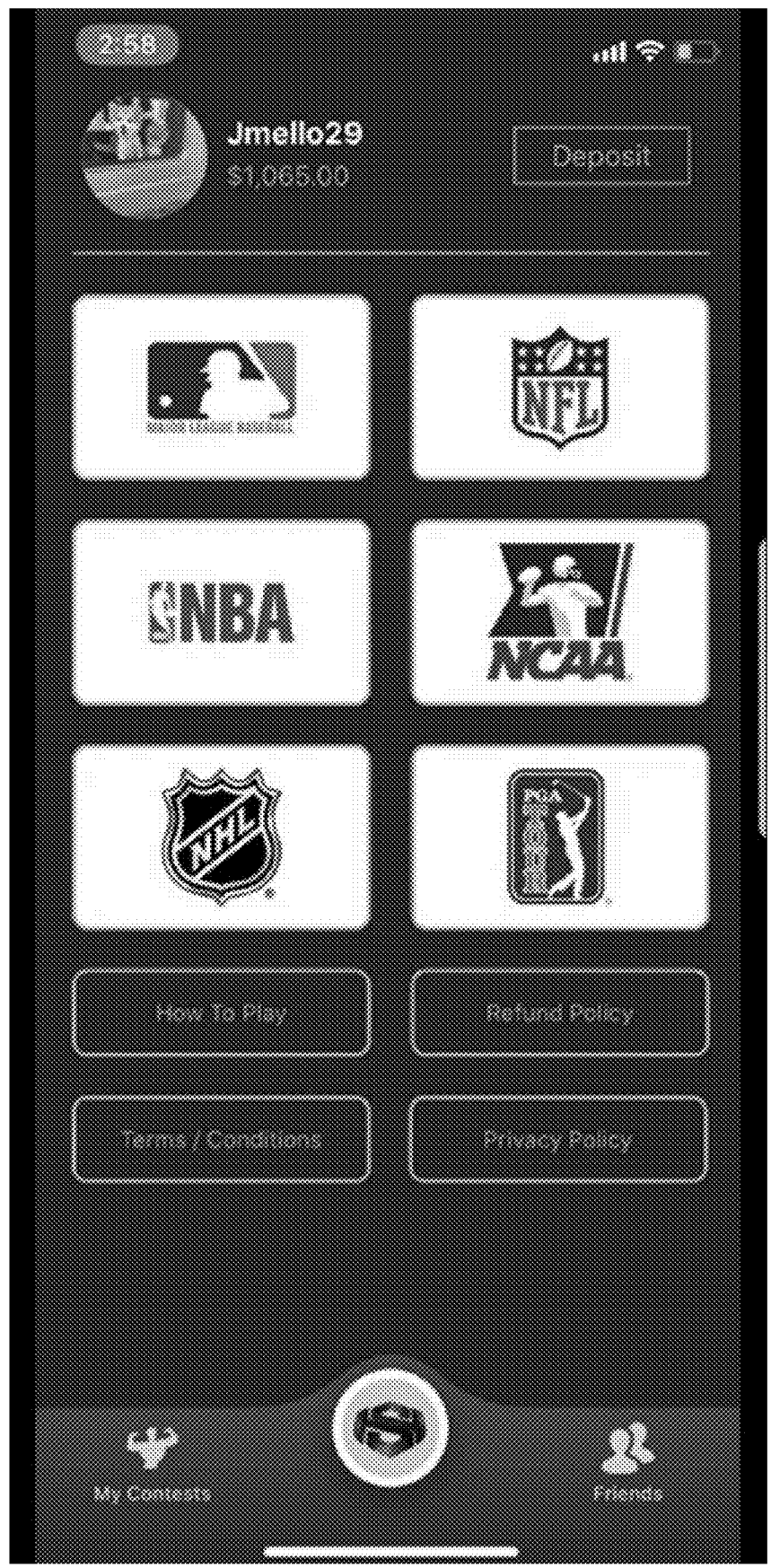
FIG. 16 illustrates an exemplary home screen or navigation page enabling the contestant to select from among different sports for the betting contest.

FIG. 16 illustrates an exemplary home screen or navigation page enabling the contestant to select from among different sports for the betting contest. Different sports selections may implicate different types of contests, as described above, with respect to FIGS. 8-10.

Figure 17:
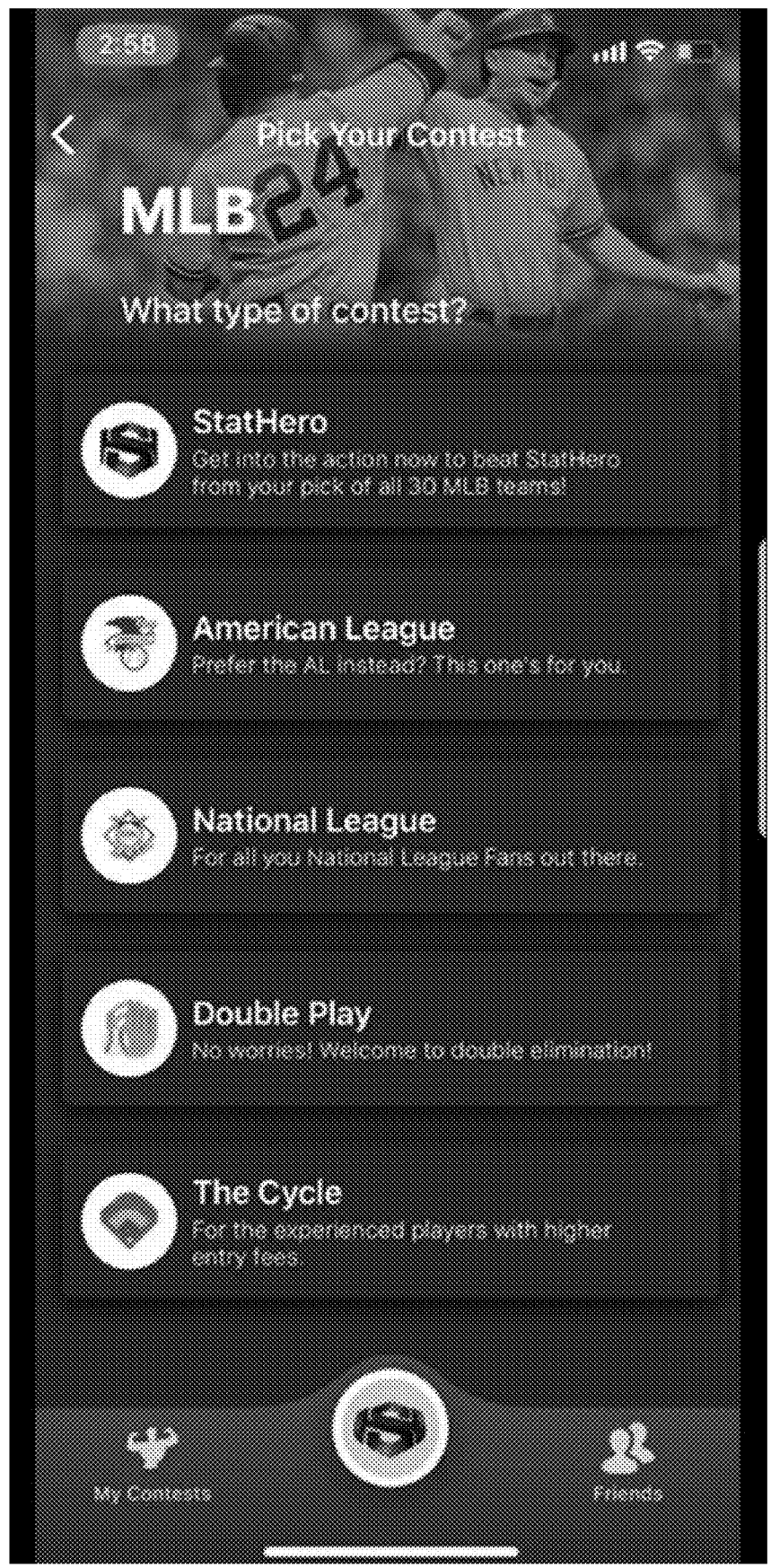
FIG. 17 illustrates an exemplary navigation screen enabling the contestant to select a contest type.

FIG. 17 illustrates an exemplary navigation screen enabling the contestant to select a contest type. Different types of contests may include single round or multiple round betting contests.

Figure 18:
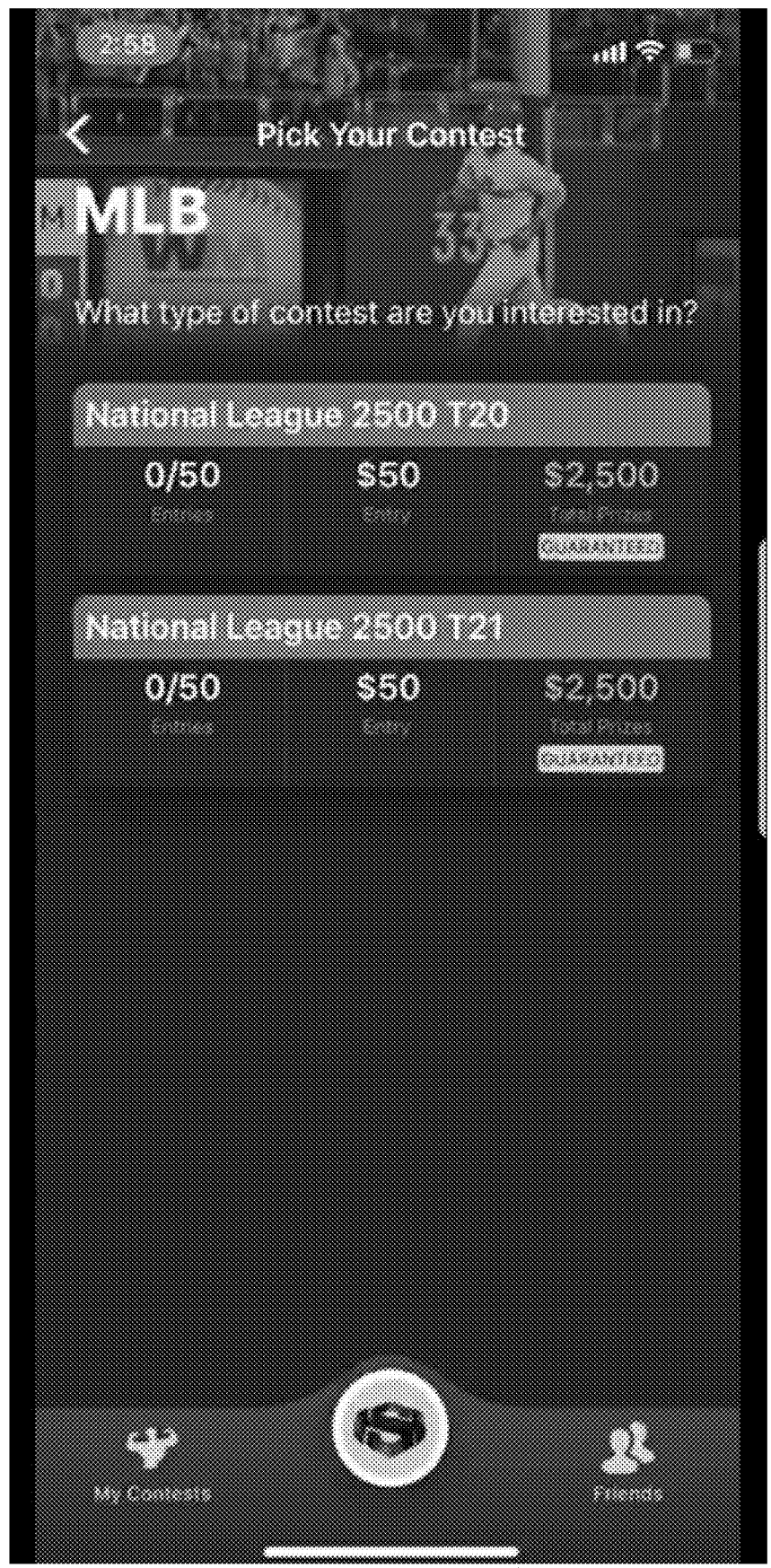
FIG. 18 illustrates an exemplary navigation screen enabling the contestant to select a specific contest.

FIG. 18 illustrates an exemplary navigation screen enabling the contestant to select a specific contest. Once a specific contest is selected, the player must pay an entry fee to place a wager and select one or more sports players to compete against the betting competition house selections.

Figure 19:
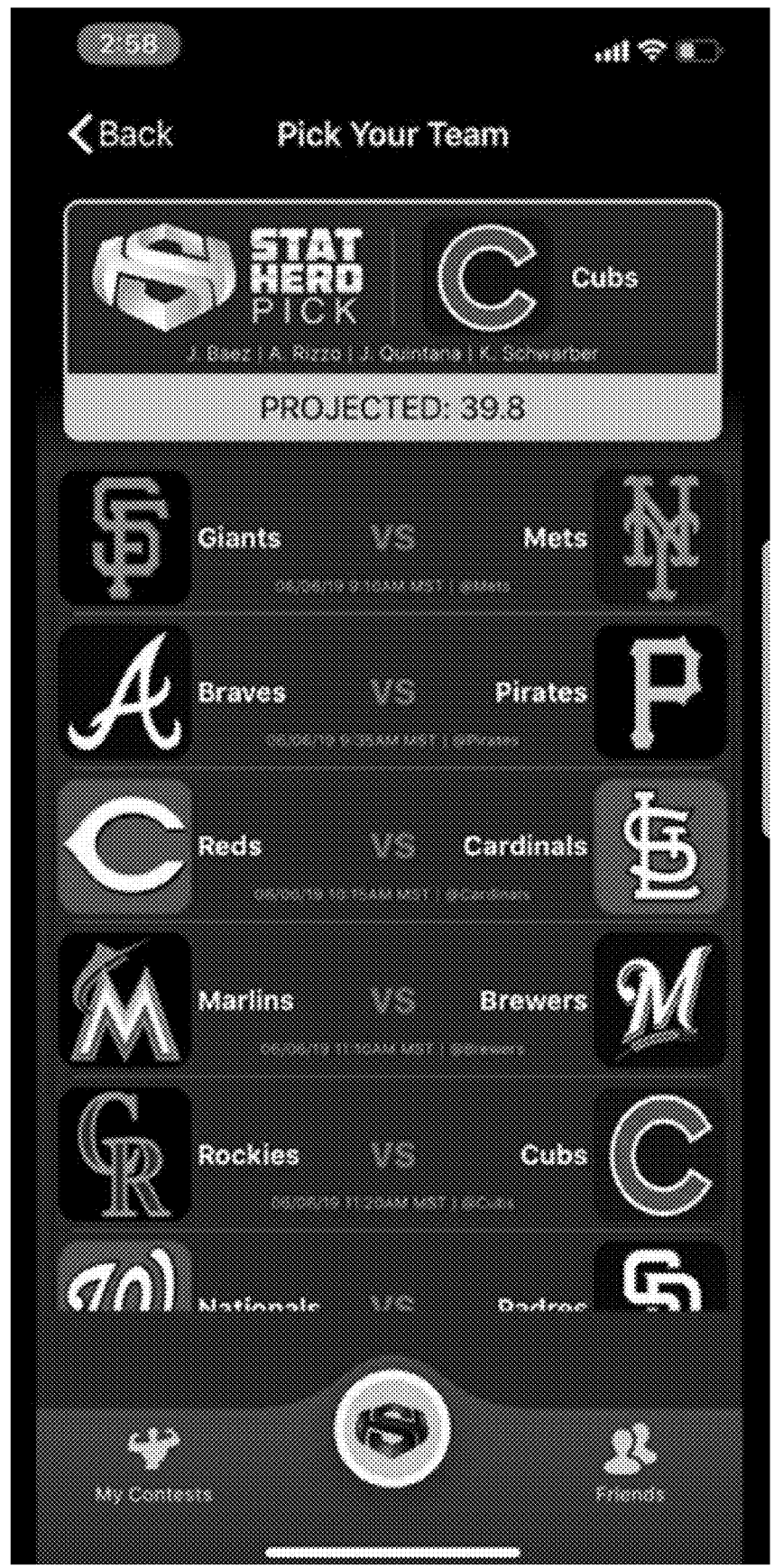
FIG. 19 illustrates an exemplary navigation screen enabling the contestant to select a specific team.

FIG. 19 illustrates an exemplary navigation screen enabling the contestant to select a specific team. In some betting competition contests, a sports team selection is required, from which team specific sports players will ultimately be selected.

Figure 20:
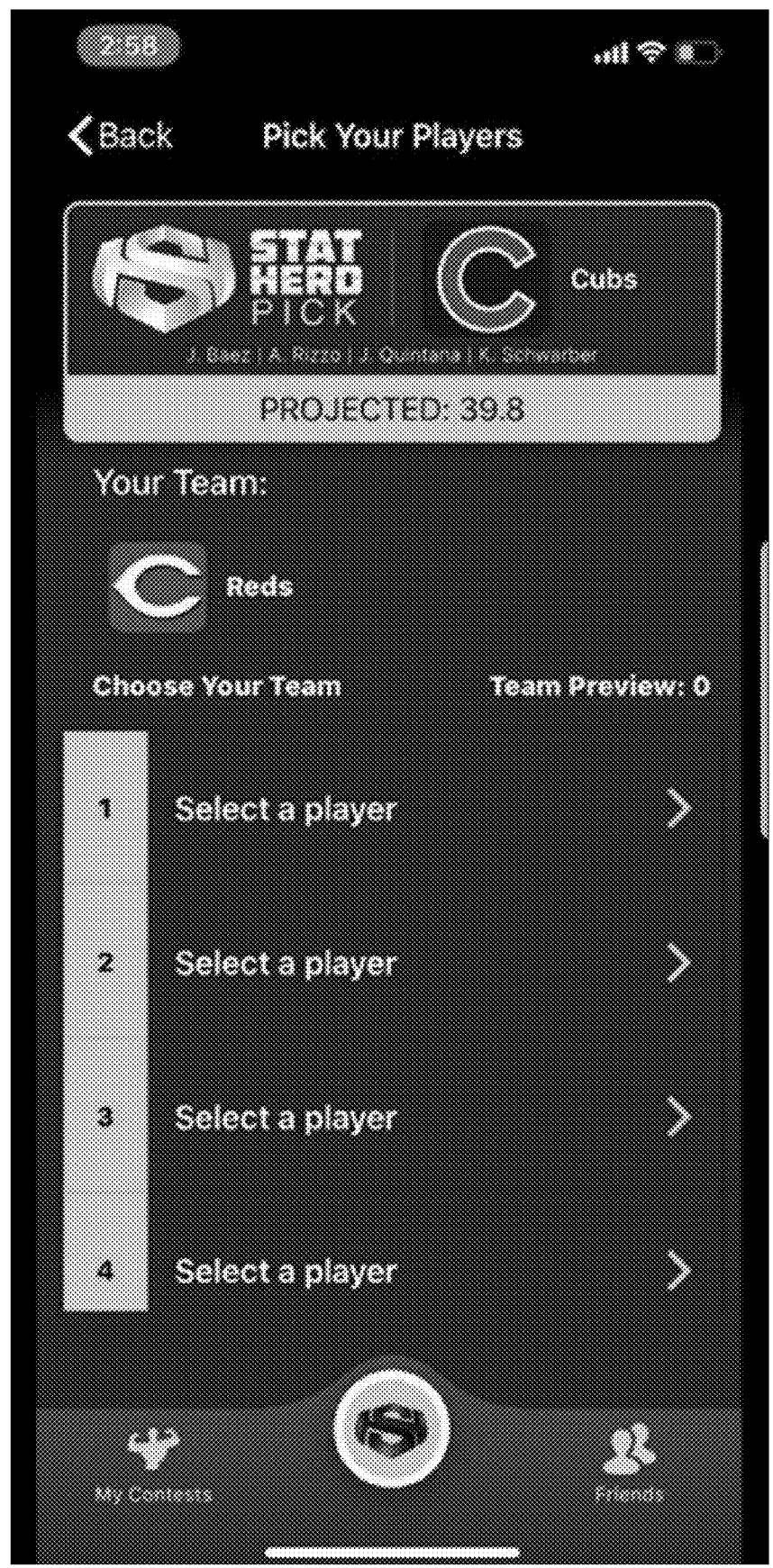
FIGS. 20-28 illustrate an exemplary navigation screen enabling the contestant to select specific players to build and submit a fantasy team roster for the betting competition.

FIG. 20 illustrates an exemplary fantasy sports team roster navigation screen enabling the contestant to build and submit a fantasy team roster for the betting competition.

Figure 21:
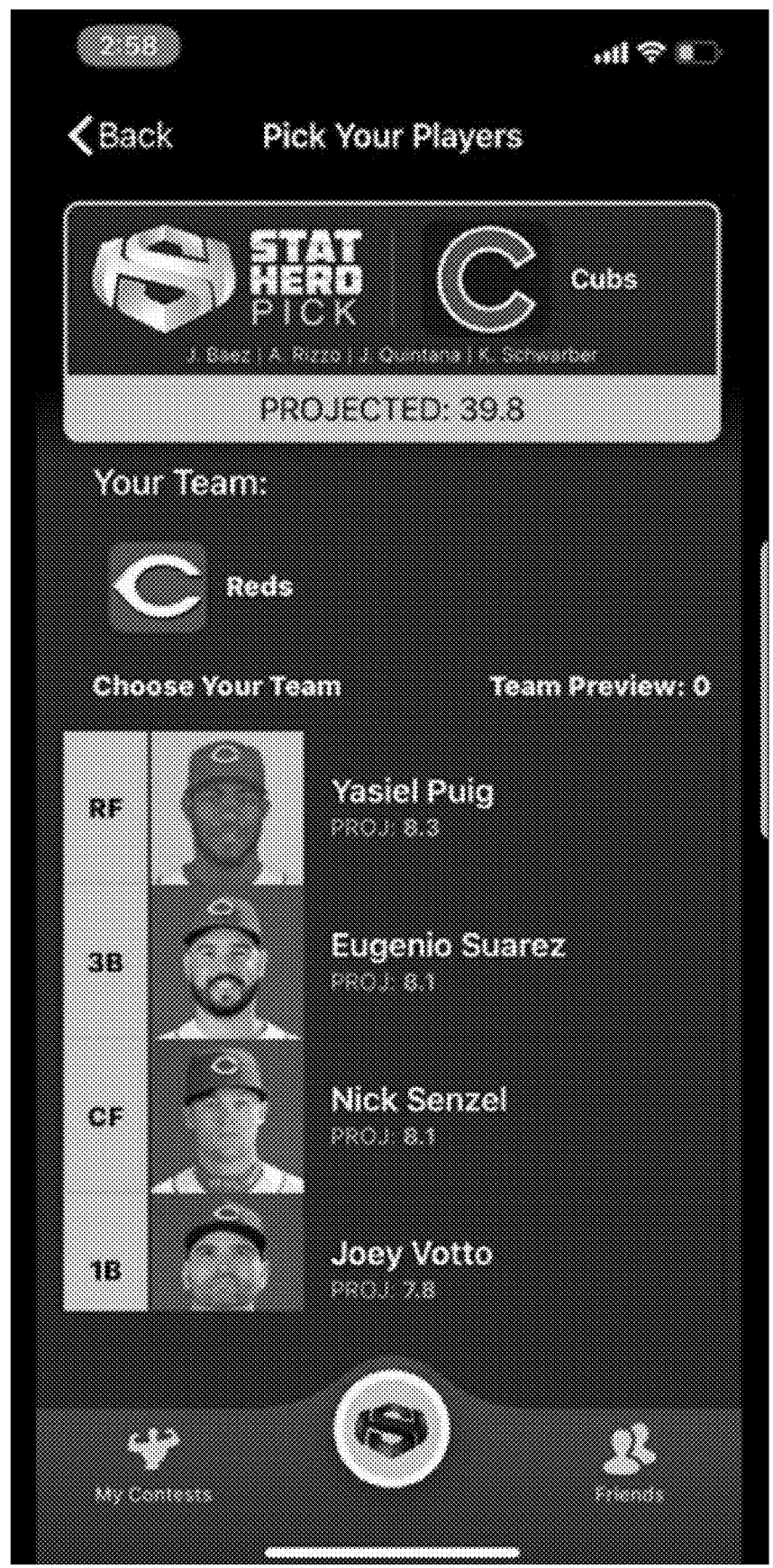

FIG. 21 illustrates an exemplary sports player selection navigation screen enabling the contestant to select specific players from the roster of a sports team or other list of sports players.

Figure 22:
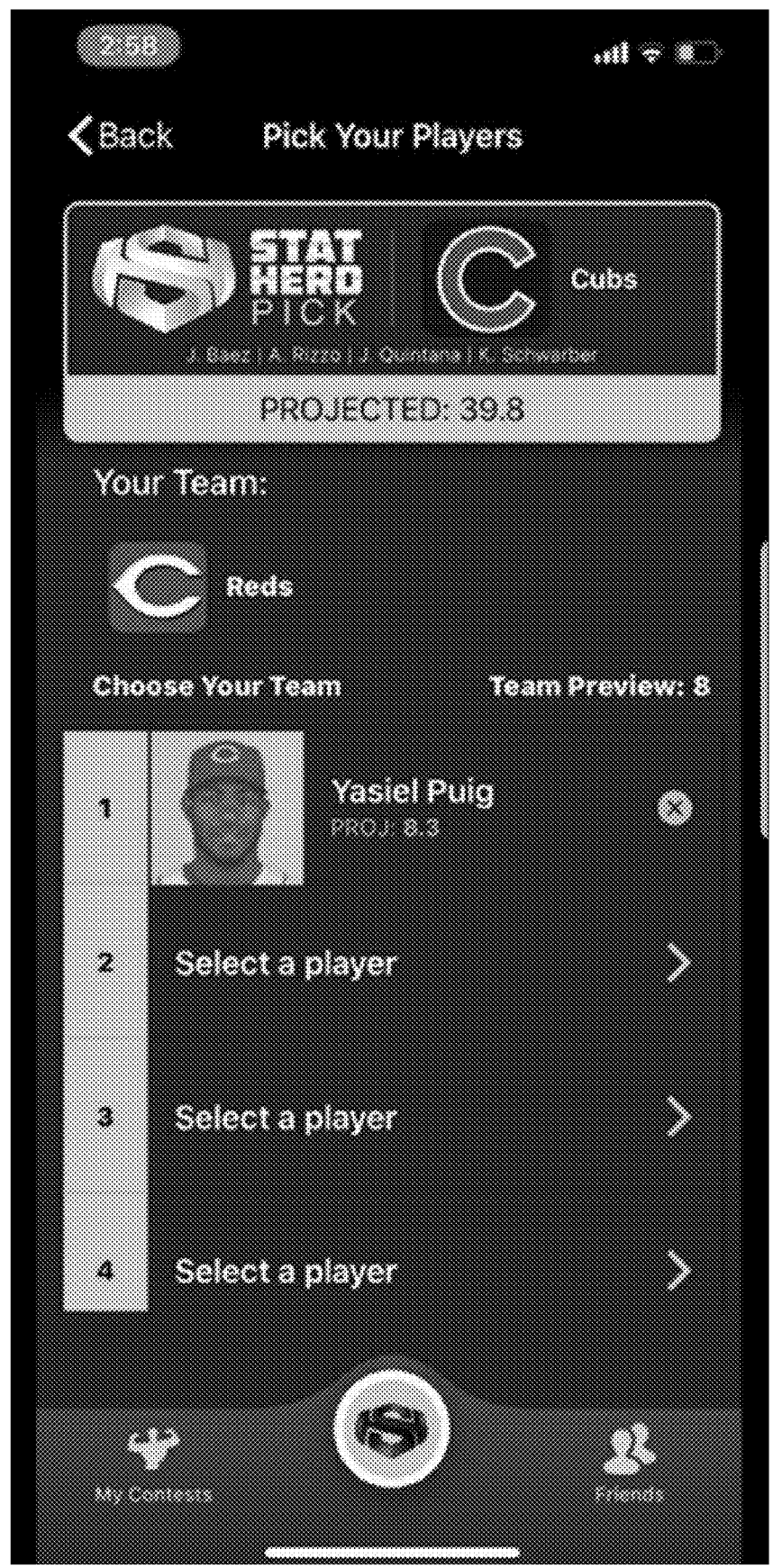

FIG. 22 illustrates a first player selection as shown on the fantasy sports team roster navigation screen.

Figure 23:
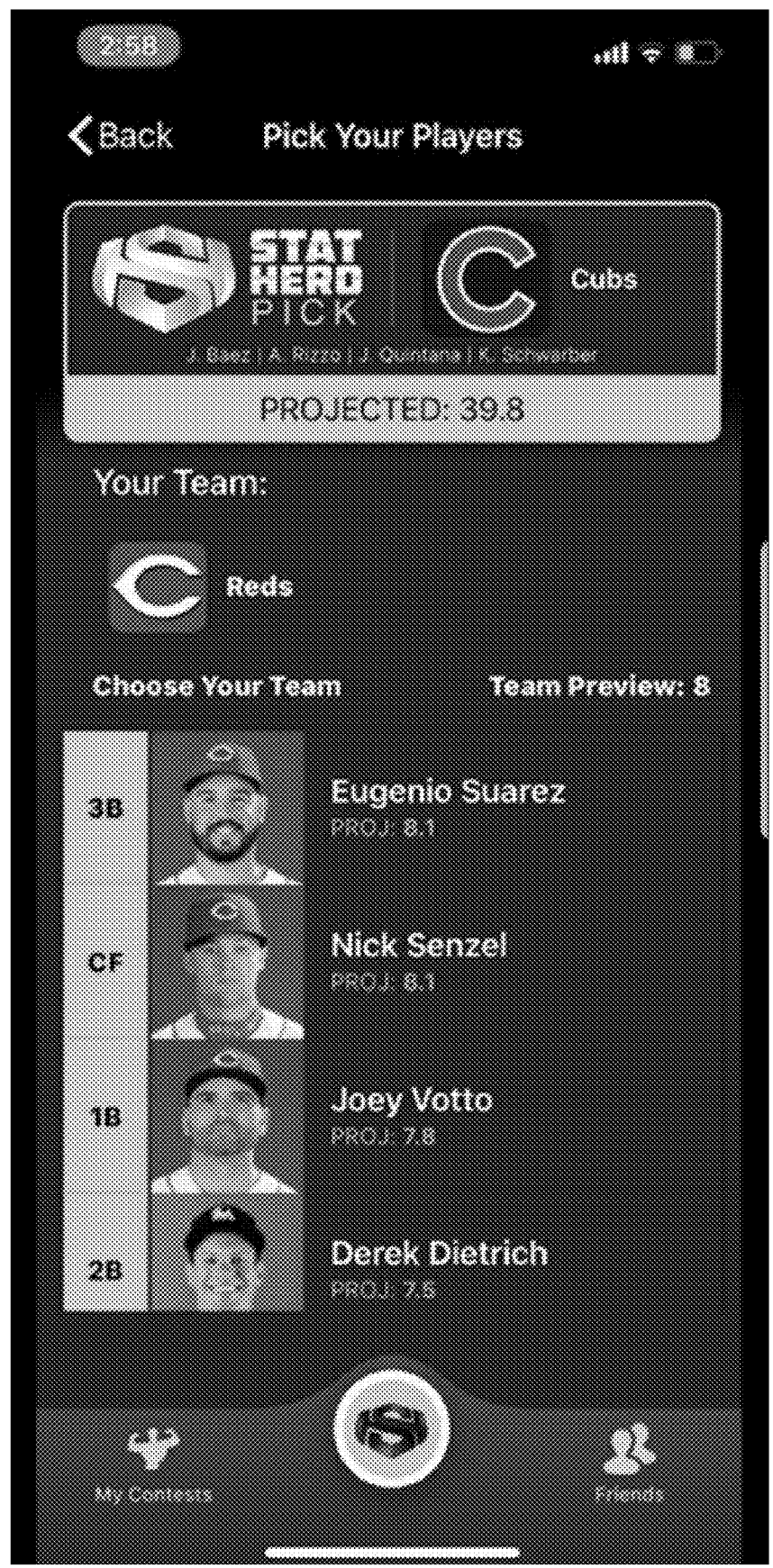

FIG. 23 illustrates an exemplary updated sports player selection navigation screen depicting an updated list of sports players that does not include the sports player(s) already selected. From this screen the contestant is enabled to select additional sports players for the fantasy sports team roster.

Figure 24:
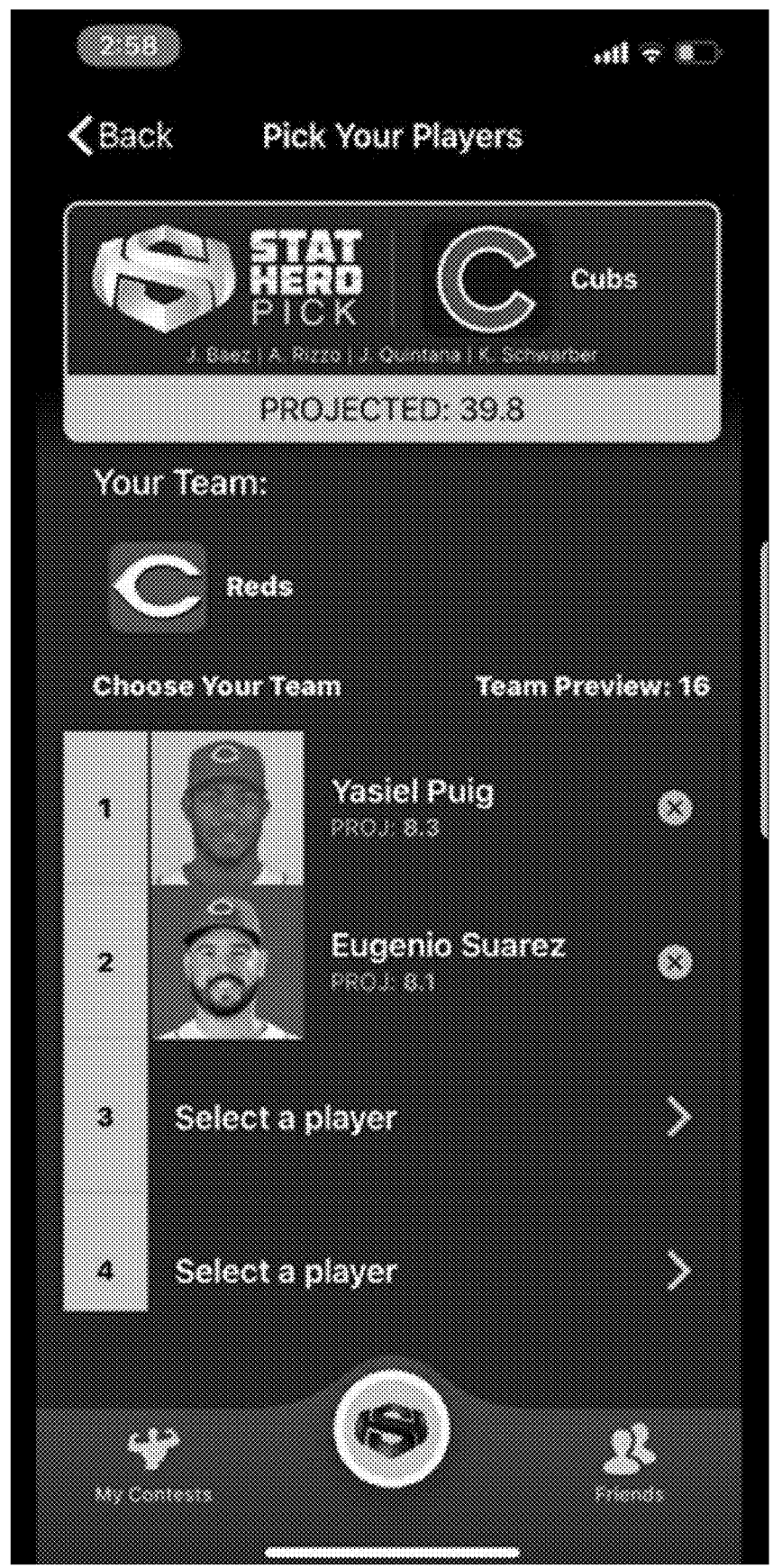

FIG. 24 illustrates an updated fantasy sports team roster player selection as shown on the fantasy sports team roster navigation screen.

Figure 25:
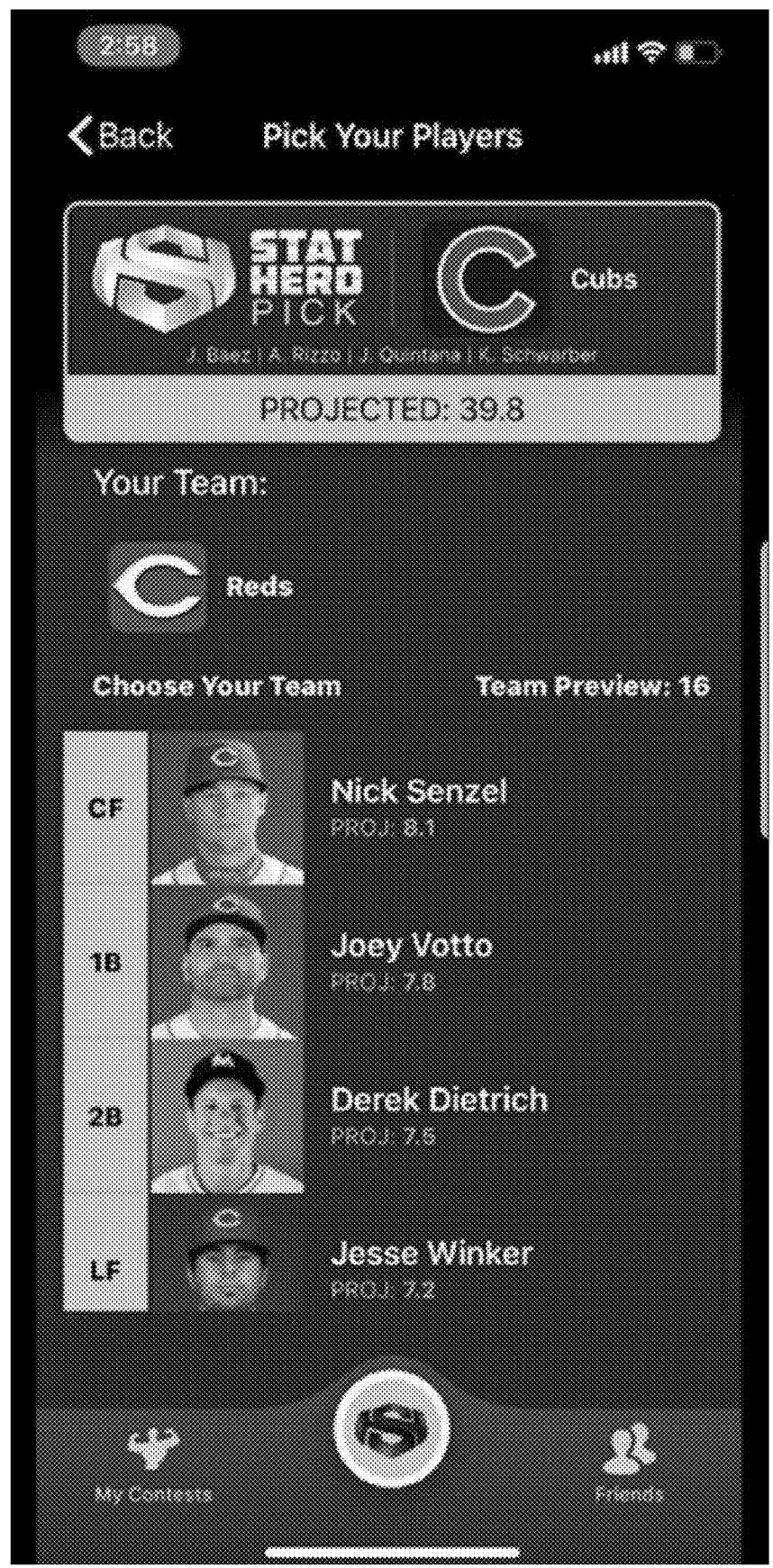
Figure 26:
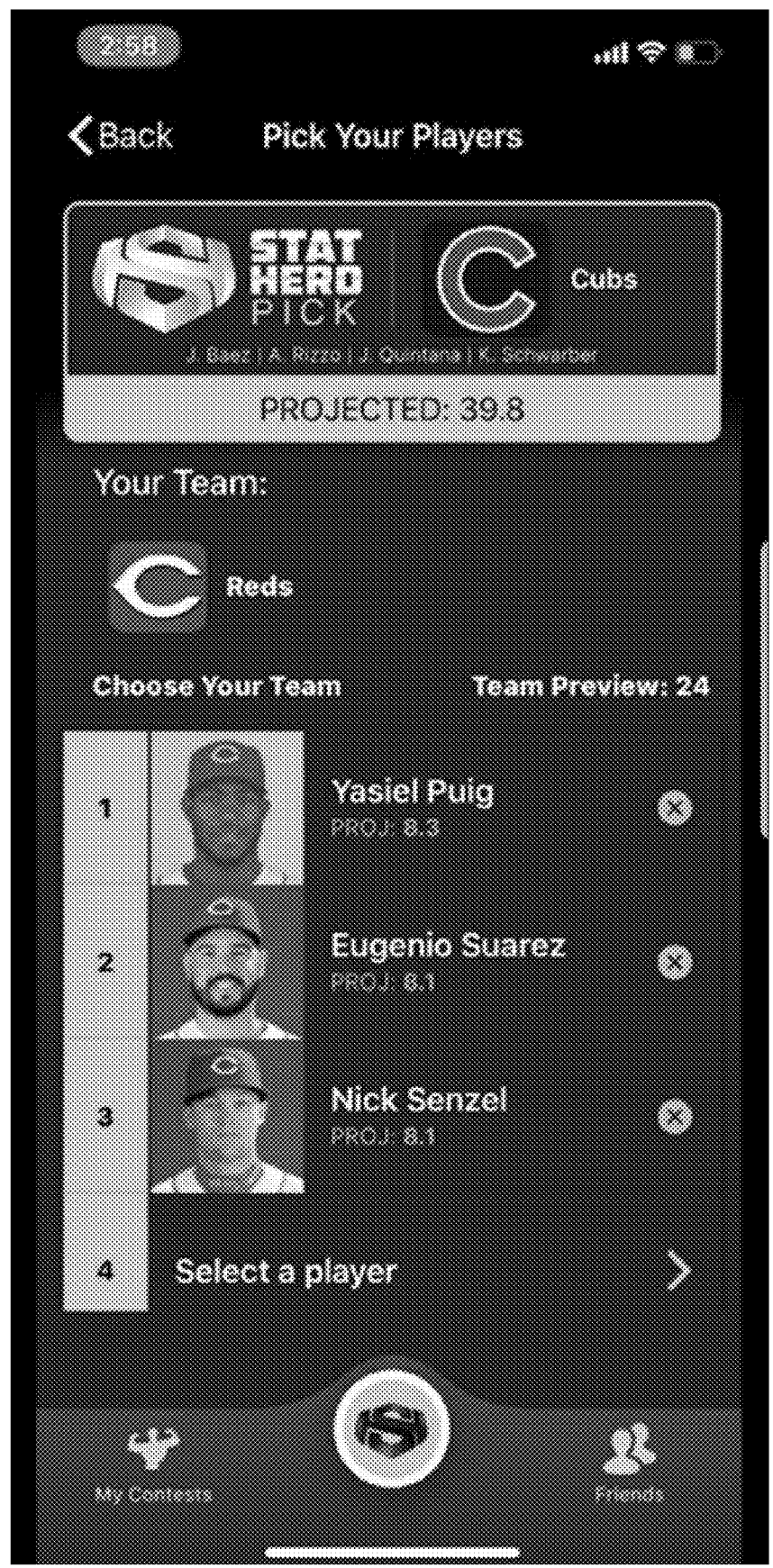
Figure 27:
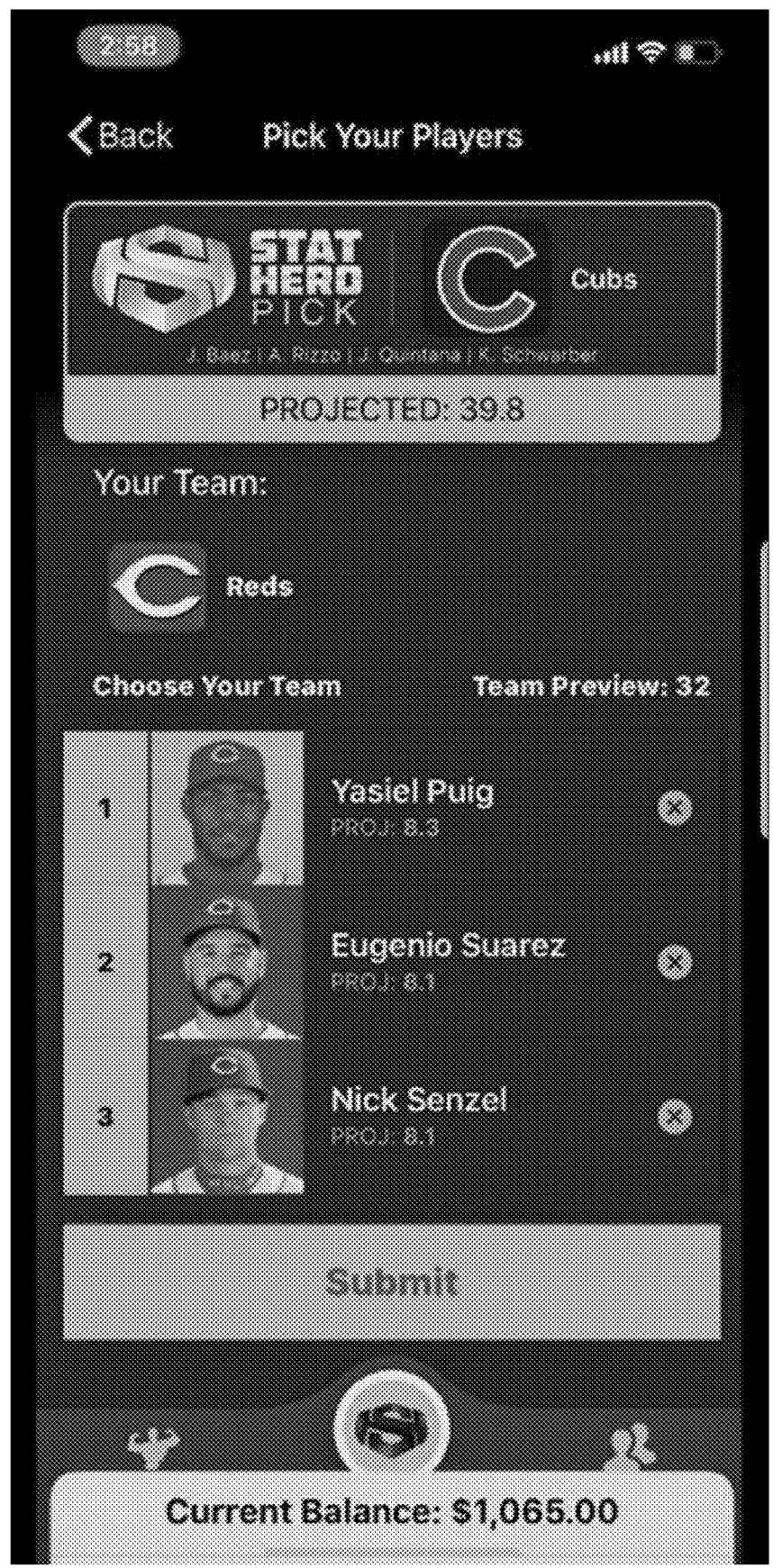

FIG. 25 illustrates a further exemplary updated sports player selection navigation screen depicting an updated list of sports players that does not include the sports player(s) already selected. From this screen the contestant is enabled to select additional sports players for the fantasy sports team roster.

Figure 28:
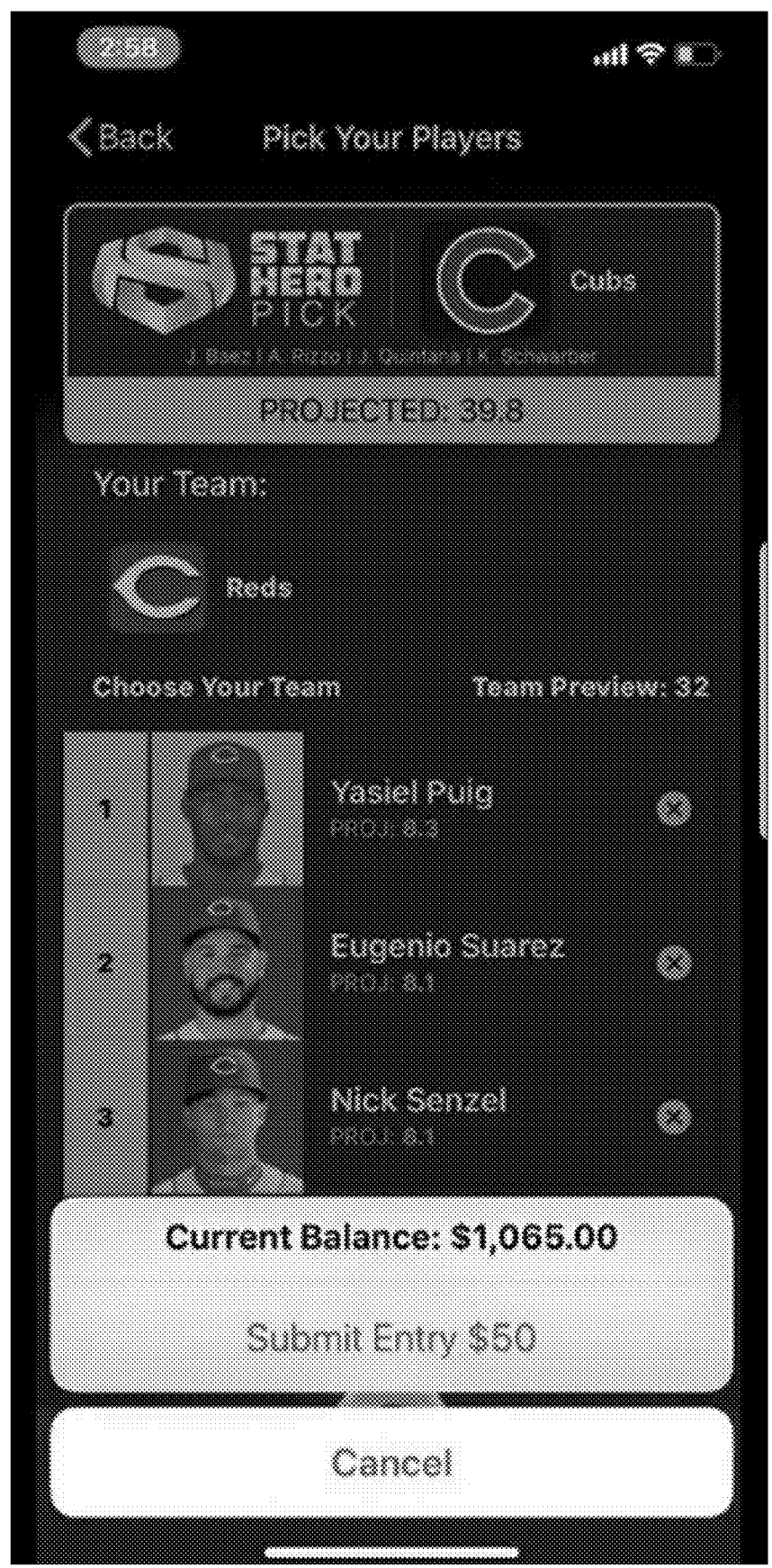

FIG. 28 illustrates a further updated fantasy sports team roster player selection as shown on the fantasy sports team roster navigation screen.

Figure 29:
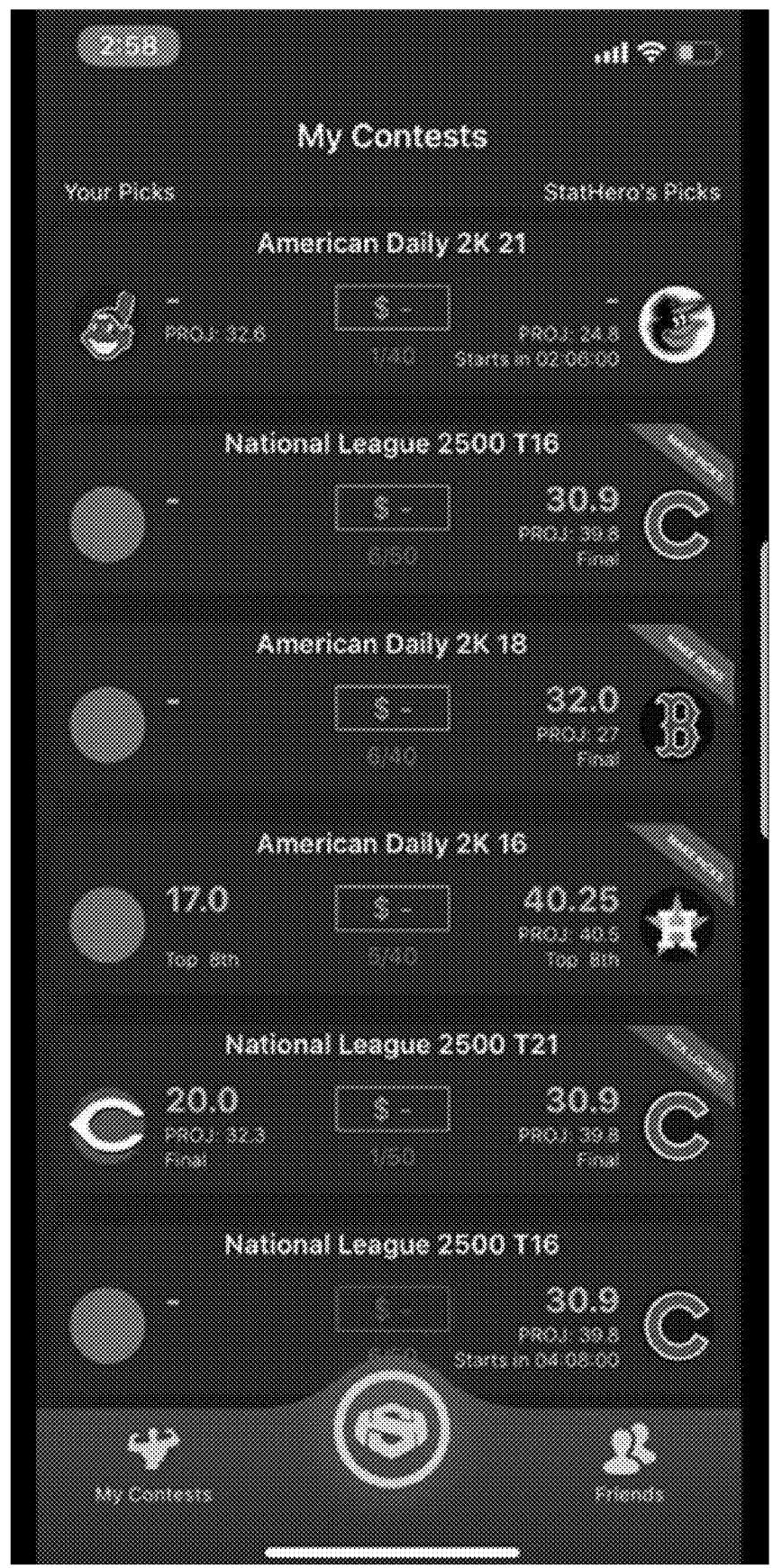
FIG. 29 illustrates an exemplary navigation screen enabling the contestant to view the various contests in which they are participating or in which they have participated.

FIG. 29 illustrates an exemplary user contests navigation screen enabling the contestant to view the various contests in which they are participating or in which they have participated. The contestant may select from among the various contests to get status updates on any wagers the contestant has placed in these contests.

Figure 30:
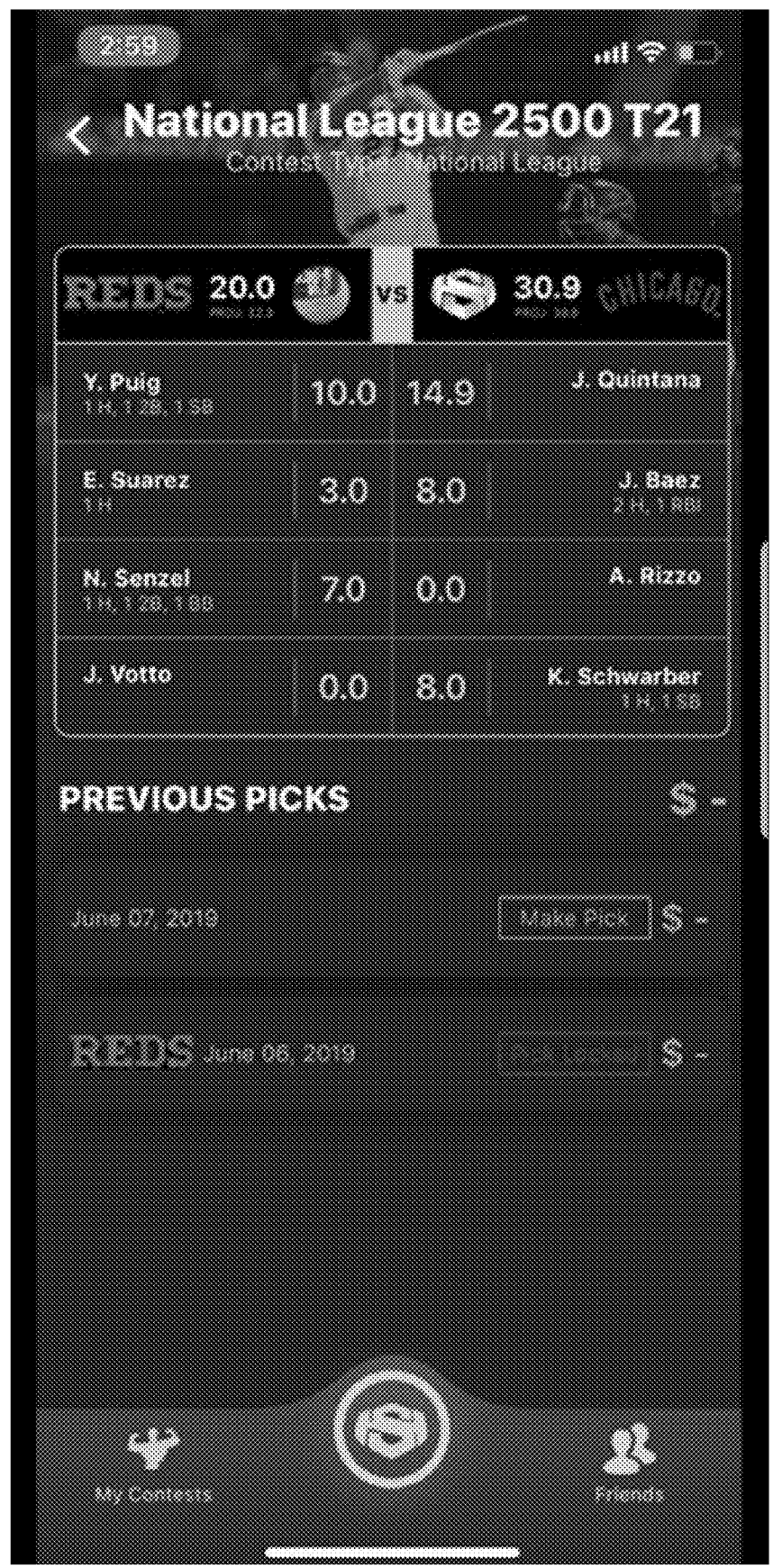
FIG. 30 illustrates an exemplary navigation screen enabling the contestant to view the status of a specific contest.

FIG. 30 illustrates an exemplary contest status navigation screen enabling the contestant to view the status of a specific contest. The contest status navigation screen may show performance metrics and fantasy points accrued to each of the one or more selected sports players, as well as aggregated performance metrics for the sports players on the fantasy sports team roster and a total fantasy score achieved by all of the sports player on the fantasy sports team roster.

It should be understood that, although specific embodiments have just been described, the claimed subject matter is not intended to be limited in scope to any particular embodiment or implementation. For instance, many of the embodiments described were in reference to or in conjunction with bat-and-ball games. However, it should be understood that many of these features, elements and limitations may also be applied to many of the other types of competitions intended to be covered by and included in the present invention, such as Chess, Go, e-sports, political events, social events, reality television contests, etc.

In the preceding description, various aspects of claimed subject matter may have been described. For purposes of explanation, specific numbers, systems, or configurations may have been set forth to provide a thorough understanding of claimed subject matter. However, it should be apparent to one skilled in the art having the benefit of this disclosure that claimed subject matter may be practiced without those specific details. In other instances, features that would be understood by one of ordinary skill in the art were omitted or simplified so as not to obscure claimed subject matter.

While certain features have been illustrated or described herein, many modifications, substitutions, or equivalents may not occur to those skilled in the art. It is, therefore, to be understood that the appended claims are intended to cover all such modifications or changes as fall within the true spirit of the claimed subject matter. Thus, it will be apparent from the foregoing that, while particular forms of the invention have been illustrated and described, various modifications can be made without parting from the spirit and scope of the invention.

What is claimed is:

1. A non-transitory computer-readable medium containing program instructions for causing an at least one computing device to perform a method of administering a multi-round betting contest, across a plurality of user devices, the method comprising the steps of:

implementing a betting contest system in memory on the at least one computing device, the betting contest system in selective communication with an at least one performance metrics system and configured for automatically administering the multi-round betting contest;

the betting contest system establishing the multi-round betting contest by:

the betting contest system creating a plurality of contest rounds to be administered by the betting contest system, each of the contest rounds being associated with an at least one future real-world competition involving a plurality of real-world competitors;

the betting contest system registering a plurality of user devices as participants in said betting contest;

the betting contest system creating a first wager pot and a second wager pot;

the betting contest system receiving an entry fee from each of the plurality of user devices;

the betting contest system determining a total wager amount by calculating a total sum of each of the received entry fees;

the betting contest system allocating a first portion of the total wager amount to the first wager pot; and the betting contest system allocating a second portion of the total wager amount to the second wager pot, and dividing the second wager pot into a plurality of round portions with each round portion associated with a one of the contest rounds;

for each contest round:

prior to the commencement of the associated at least one real-world competition:

the betting contest system generating a house selection comprising at least one of the real-world competitors involved in said at least one real-world competition associated with said contest round; and the betting contest system receiving a user selection from each of the plurality of user devices, each user selection comprising at least one of the real-world competitors involved in said at least one real-world competition associated with said contest round;

the betting contest system obtaining from the at least one performance metrics system an at least one competitor metric associated with each of the real-world competitors involved in said at least one real-world competition associated with said contest round; and upon conclusion of said contest round:

the betting contest system calculating a house score based on the at least one competitor metric associated with each of the at least one real-world competitor of the house selection;

for each user device:

the betting contest system calculating a user score based on the at least one competitor metric associated with each of the at least one real-world competitor of the associated user selection;

upon determining that the user score is greater than the house score, the betting contest system adding said user device to a winner group; and upon determining that the user score is less than or equal to the house score, the betting contest system eliminating said user device from the multi-round betting contest;

upon the betting contest system determining that the winner group contains no user devices, the betting contest system concluding the multi-round betting contest;

upon the betting contest system determining that the winner group contains one user device:
- the betting contest system awarding the corresponding round portion of the second wager pot to said user device;
- the betting contest system awarding the first wager pot to said user device; and
- the betting contest system concluding the multi-round betting contest; and upon the betting contest system determining that the winner group contains a plurality of user devices:
- the betting contest system awarding each of said user devices of said winner group a portion of the corresponding round portion of the second wager pot;
- upon the betting contest system determining that the winner group contains a quantity of user devices that is less than a pre-defined threshold quantity:
  - the betting contest system obtaining a vote from each user device of said winner group as to whether to conclude the multi-round betting contest prematurely; and
  - upon the betting contest system determining that a pre-defined percentage of the user devices of said winner group have voted to conclude the multi-round betting contest prematurely:
    - the betting contest system awarding each of said user devices a portion of the first wager pot; and
    - the betting contest system concluding the multi-round betting contest; and
    - the betting contest system commencing a subsequent one of the contest rounds with the user devices of said winner group; and upon conclusion of all contest rounds of the multi-round betting contest, the betting contest system awarding each user device of the winner group a portion of the first wager pot.

2. The method of claim 1, wherein the step of the betting contest system receiving a user selection from each of the plurality of user devices further comprises the step of the betting contest system receiving an at least one team captain designation from each of the plurality of user devices, the at least one team captain designation being associated with at least one real-world competitor of the corresponding user selection which, in turn, adds a multiplier to the corresponding user score.

3. The method of claim 1, wherein the step of the betting contest system receiving a user selection from each of the plurality of user devices further comprises the step of the betting contest system receiving an at least one wild card selection from each of the plurality of user devices, the at least one wild card selection being at least one real-world competitor involved in said at least one real-world competition associated with said contest round.

4. The method of claim 1, wherein the step of the betting contest system determining that the winner group contains a quantity of user devices that is less than a pre-defined threshold quantity further comprises the step of the betting contest system determining that the winner group contains less than ten percent of the plurality of user devices remaining in the multi-round betting contest.

5. The method of claim 1, wherein the step of the betting contest system determining that the winner group contains a quantity of user devices that is less than a pre-defined threshold quantity further comprises the step of the betting contest system determining that the winner group contains less than fifty percent of the plurality of user devices remaining in the multi-round betting contest.

6. A method for administering a multi-round betting contest across a plurality of user devices, the method comprising the steps of:

implementing a betting contest system in memory on an at least one computing device, the betting contest system in selective communication with an at least one performance metrics system and configured for automatically administering the multi-round betting contest;

the betting contest system establishing the multi-round betting contest by:
- the betting contest system creating a plurality of contest rounds to be administered by the betting contest system, each of the contest rounds being associated with an at least one future real-world competition involving a plurality of real-world competitors;
- the betting contest system registering a plurality of user devices as participants in said betting contest;
- the betting contest system creating a first wager pot and a second wager pot;
- the betting contest system receiving an entry fee from each of the plurality of user devices;
- the betting contest system determining a total wager amount by calculating a total sum of each of the received entry fees;
- the betting contest system allocating a first portion of the total wager amount to the first wager pot; and
- the betting contest system allocating a second portion of the total wager amount to the second wager pot, and dividing the second wager pot into a plurality of round portions with each round portion associated with a one of the contest rounds;

for each contest round:
- prior to the commencement of the associated at least one real-world competition:
  - the betting contest system generating a house selection comprising at least one of the real-world competitors involved in said at least one real-world competition associated with said contest round; and
  - the betting contest system receiving a user selection from each of the plurality of user devices, each user selection comprising at least one of the real-world competitors involved in said at least one real-world competition associated with said contest round;
- the betting contest system obtaining from the at least one performance metrics system an at least one competitor metric associated with each of the real-world competitors involved in said at least one real-world competition associated with said contest round; and
- upon conclusion of said contest round:
  - the betting contest system calculating a house score based on the at least one competitor metric associated with each of the at least one real-world competitor of the house selection;

for each user device:
   the betting contest system calculating a user score based on the at least one competitor metric associated with each of the at least one real-world competitor of the associated user selection;
   upon determining that the user score is greater than the house score, the betting contest system adding said user device to a winner group; and
   upon determining that the user score is less than or equal to the house score, the betting contest system eliminating said user device from the multi-round betting contest;
upon the betting contest system determining that the winner group contains no user devices, the betting contest system concluding the multi-round betting contest;
upon the betting contest system determining that the winner group contains one user device:
   the betting contest system awarding the corresponding round portion of the second wager pot to said user device;
   the betting contest system awarding the first wager pot to said user device; and
   the betting contest system concluding the multi-round betting contest; and
upon the betting contest system determining that the winner group contains a plurality of user devices:
   the betting contest system awarding each of said user devices of said winner group a portion of the corresponding round portion of the second wager pot;
   upon the betting contest system determining that the winner group contains a quantity of user devices that is less than a pre-defined threshold quantity:
     the betting contest system obtaining a vote from each user device of said winner group as to whether to conclude the multi-round betting contest prematurely; and
     upon the betting contest system determining that a pre-defined percentage of the user devices of said winner group have voted to conclude the multi-round betting contest prematurely:
       the betting contest system awarding each of said user devices a portion of the first wager pot; and
       the betting contest system concluding the multi-round betting contest; and
     the betting contest system commencing a subsequent one of the contest rounds with the user devices of said winner group; and
   upon conclusion of all contest rounds of the multi-round betting contest, the betting contest system awarding each user device of the winner group a portion of the first wager pot.

7. The method of claim 6, wherein the step of the betting contest system receiving a user selection from each of the plurality of user devices further comprises the step of the betting contest system receiving an at least one team captain designation from each of the plurality of user devices, the at least one team captain designation being associated with at least one real-world competitor of the corresponding user selection which, in turn, adds a multiplier to the corresponding user score.

8. The method of claim 6, wherein the step of the betting contest system receiving a user selection from each of the plurality of user devices further comprises the step of the betting contest system receiving an at least one wild card selection from each of the plurality of user devices, the at least one wild card selection being at least one real-world competitor involved in said at least one real-world competition associated with said contest round.

9. The method of claim 6, wherein the step of the betting contest system determining that the winner group contains less than ten percent of the plurality of user devices remaining in the multi-round betting contest.

10. The method of claim 6, wherein the step of the betting contest system determining that the winner group contains a quantity of user devices that is less than a pre-defined threshold quantity further comprises the step of the betting contest system determining that the winner group contains less than fifty percent of the plurality of user devices remaining in the multi-round betting contest.

* * * * *